United States Patent
Matsuura et al.

[11] Patent Number: 5,813,724
[45] Date of Patent: Sep. 29, 1998

[54] ADJUSTABLE HINGE MOUNT FOR RECLINABLE SEAT

[75] Inventors: Hiroshi Matsuura, Hamamatsu; Kunihisa Sugimoto, Kosai; Isao Ikegaya, Arai; Masakiyo Ohya, Kosai, all of Japan

[73] Assignee: Fuji Kiko Co., Ltd., Tokyo, Japan

[21] Appl. No.: 668,810

[22] Filed: Jun. 24, 1996

[30] Foreign Application Priority Data

| Jun. 23, 1995 | [JP] | Japan | 7-157437 |
| Jun. 30, 1995 | [JP] | Japan | 7-165819 |
| Jun. 30, 1995 | [JP] | Japan | 7-165820 |
| Jun. 30, 1995 | [JP] | Japan | 7-165821 |
| Jul. 6, 1995 | [JP] | Japan | 7-170079 |
| Nov. 30, 1995 | [JP] | Japan | 7-312206 |
| Dec. 26, 1995 | [JP] | Japan | 7-338345 |
| Jan. 30, 1996 | [JP] | Japan | 8-013464 |
| Mar. 28, 1996 | [JP] | Japan | 8-073024 |

[51] Int. Cl.$^6$ .............................. B60N 2/02; B60N 2/48
[52] U.S. Cl. ..................... 297/367; 297/368; 297/365
[58] Field of Search ................. 297/362, 363, 297/364, 365, 367, 368, 369, 366

[56] References Cited

U.S. PATENT DOCUMENTS

| 4,082,352 | 4/1978 | Bales et al. | 297/367 |
| 4,275,924 | 6/1981 | Lehmann et al. . | |
| 4,394,048 | 7/1983 | Sakurai et al. | 297/367 |
| 4,563,039 | 1/1986 | Jorg . | |
| 4,659,146 | 4/1987 | Janiaud . | |
| 4,770,464 | 9/1988 | Pipon et al. | 297/367 |
| 4,789,205 | 12/1988 | Pipon et al. . | |
| 5,586,833 | 12/1996 | Vossmann et al. | 297/362 |
| 5,622,408 | 4/1997 | Yamada et al. | 297/363 |

FOREIGN PATENT DOCUMENTS

| 2932873 | 2/1981 | Germany | 297/363 |
| 61-276511 | 12/1986 | Japan . | |
| 63-023619 | 1/1988 | Japan . | |
| 6-137407 | 5/1994 | Japan . | |

*Primary Examiner*—Peter R. Brown
*Assistant Examiner*—Anthony D. Barfield
*Attorney, Agent, or Firm*—Foley & Lardner

[57] ABSTRACT

An adjustable hinge mount in which a first hinge member is fixed to a seat proper or frame and a second hinge member fixed to the seat back comprises a control arrangement acting on a bearing plate with upper teeth for locking engagement with internal teeth of the second hinge member. The bearing plate is guided by spaced guide walls of the first hinge member and pushed by an elevated portion of a cam pivotable about an axle together with a lever which is pivotable about the axle. Pivoting the lever to an unlocking or released position causes the cam to disengage from the internal teeth.

41 Claims, 26 Drawing Sheets

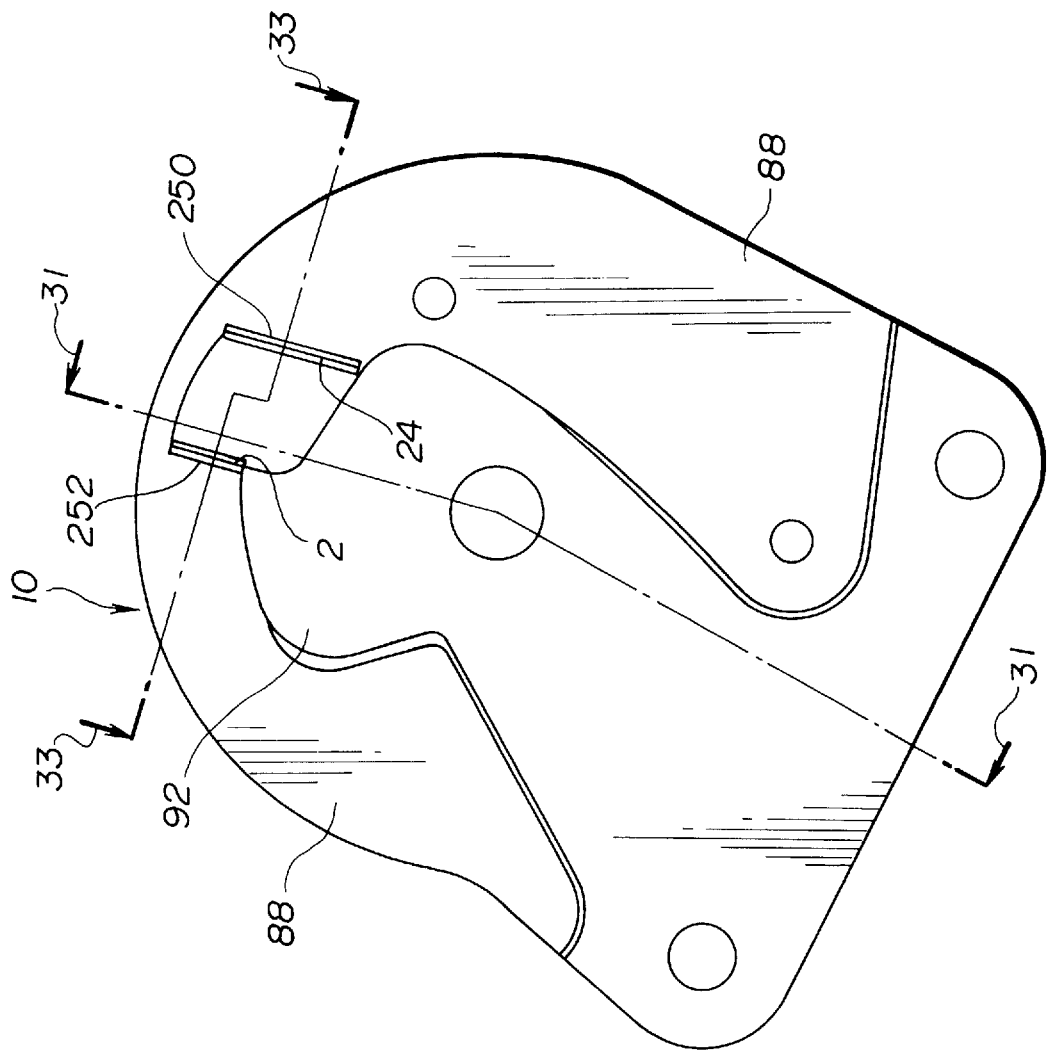
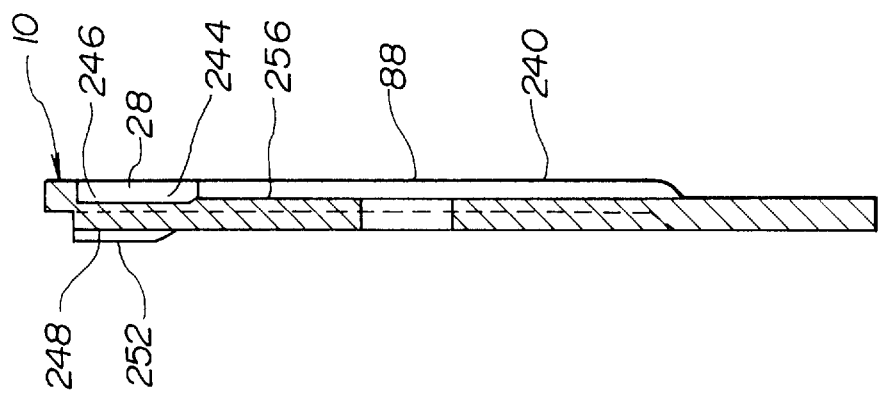

ADJUSTABLE HINGE MOUNT FOR RECLINABLE SEAT

BACKGROUND OF THE INVENTION

1. Field of the Invention

The present invention relates to an adjustable hinge mount for seats having an adjustable seat back.

2. Description of the Prior Art

There is already known for a long time vehicle seats currently used in automtive vehicles. These seats comprise a seat back the inclination of which can be adjusted relative to a seat proper or seat frame. A plurality of more or less complicated mechanisms have already been proposed for adjusting a seat back with respect to a seat proper. However, all is the known mechanisms have particular drawbacks in that, with a certain time of use, because of the design of the hinge and also because of vibrations to the vehicle, clearances are formed in the toothing of the members provided for locking the seat back with respect to the seat proper. Therefore, the safety is not properly ensured and the seat back is not rigidly fixed and therefore provide a bad impression for the seat occupant.

An object of the present invention is to remedy the above-mentioned drawbacks and provide a compact adjustable hinge mount with less manufacturing cost, with less complicated structure and with less weight.

SUMMARY OF THE INVENTION

According to the present invention, there is provided an adjustable hinge mount for a seat having a reclinable seat back, comprising:

a first hinge member fixed to the seat;

a second hinge member fixed to the seat back;

an axle interconnecting said first and second hinge members;

a spring coupled between said first and second hinge members for pivotably biasing said second hinge member in a forward direction about said axle;

internal teeth formed in said second hinge member along an arcuate surface centered on said axle;

a bearing plate having upper teeth for locking cooperation with said internal teeth;

spaced guide walls formed in said first hinge member for guiding said bearing plate in reciprocal directions relative to said guide walls;

said bearing plate having front and rear faces, with respect to said forward direction, for slidable cooperation with said guide walls, respectively; and control means for controlling the motion of said bearing plate into and out of engagement with said internal teeth, said control means including a lever pivotably connected to said first hinge member, and a cam in unitary motion with said lever for camming said teeth of said plate into engagement with said internal teeth of said first hinge member.

BRIEF DESCRIPTION OF THE DRAWINGS

FIG. 31 is a front sectional view of a hinge member connectable to the seat, the section being taken through the line 31—31 in FIG. 32;

FIG. 32 is a side view of the hinge member shown in FIG. 31;

DETAILED DESCRIPTION OF THE INVENTION

Figure 1:
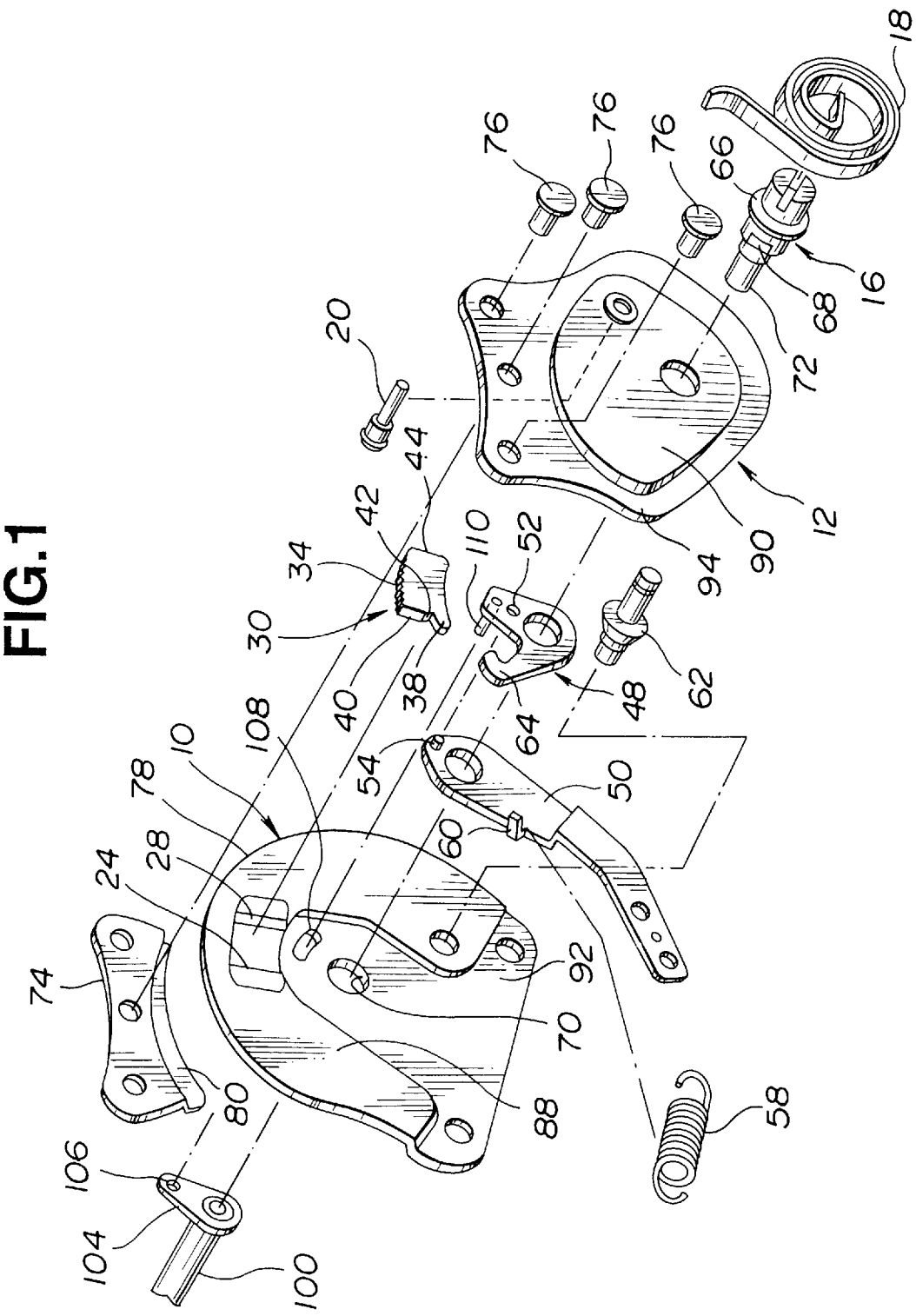
FIG. 1 is an exploded perspective view of a portion of a seat recliner, showing parts of an adjustable hinge mount for a seat having a reclinable seat back.
Figure 2:
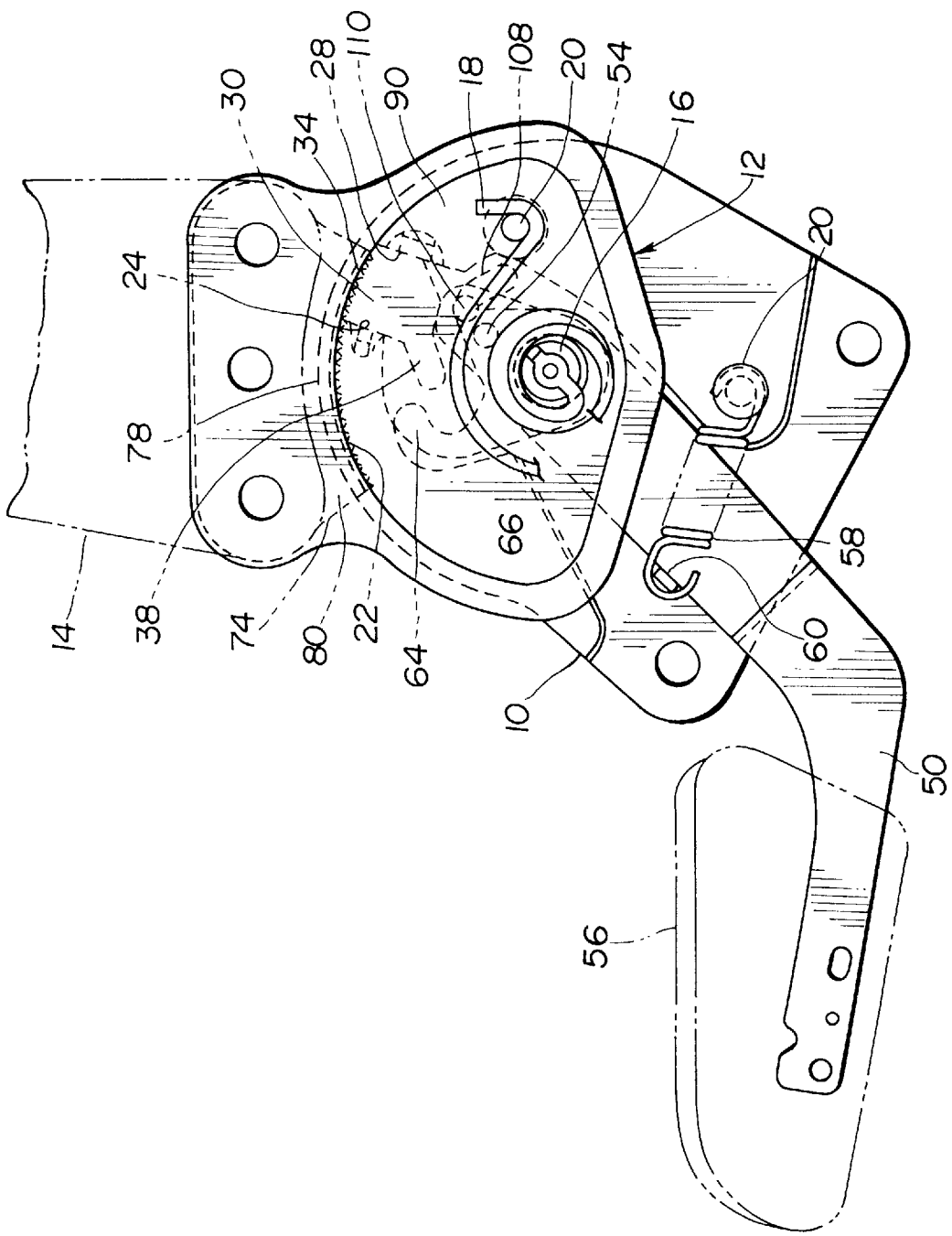
FIG. 2 is a side view of the adjustable hinge mount as being mounted to a left hand rear corner of the seat, showing the parts in a locked position.
Figure 3:
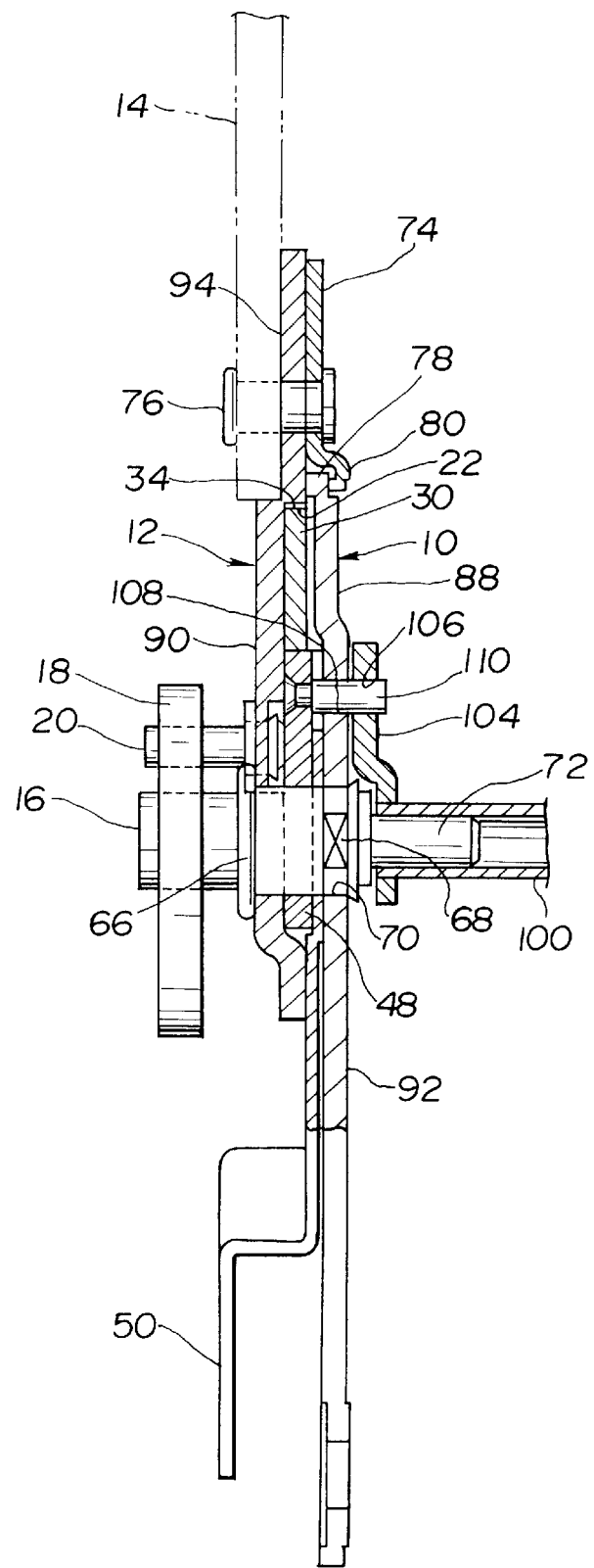
FIG. 3 is an enlarged rear view, partly broken away, of the adjustable hinge mount shown in FIG. 2.

Referring firstly to FIGS. 1 to 3, the adjustable hinge mount is designed for use in connection with a vehicle seat having a reclinable seat back. The hinge mount includes a hinge member 10 connectable to a lateral side of the seat proper and a hinge member 12 connectable to a lateral side of the reclinable seat back at a frame 14 thereof as illustrated by the phantom line in FIG. 2. The two hinge members 10 and 12 are supported on and interconnected by an axle 16. A spring 18 is coupled between the hinge members 10 and 12 for pivotably biasing the hinge member 12 in a forward direction about the axle 16. A free end of the axle 16 is formed with a hooking slot to secure an inner end of the spring 18. A hooking pin 20 of the hinge member 12 is used for supporting an outer end of the spring 18. Thus, the spring 18 has a tendency to permanently return the seat back against the back of the seat occupant. Upper arcuate internal teeth 22 centered on the axle 16 are integrally formed on the hinge member 12. The hinge member 10 has two spaced guide walls 24 and 28 under the arcuate internal teeth 22 for guiding a bearing plate 30 formed at the upper part thereof with upper teeth 34 for locking cooperation with the actuate internal teeth 22. The bearing plate 30 is out at the lower part thereof to form a lower surface part 36 and has a front lug 38 projecting from a front face 40 thereof. The front lug 38 cooperates with the front face 40 to define a notch 42. The bearing plate 30 has a rear face 44. The front and rear faces 40 and 44, with respect to the forward diection in which the hinge member 12 is biased by the spring 18, are spaced and parallel to each other for slidable cooperaion with the guide walls 24 and 28, respectively.

The slope 36 of the bearing plate 30 rests on an elevated portion 46 of a cam 48 which is pivotably supported on the axle 16. The cam 48 is connected to one end of a lever 50 pivotably mounted to the axle 16 for a unitary motion with the lever 50. This connection is accomplished by press fit into a hole 52 of an emboss 54 of the lever 50. The front part of the lever 50 carries a handle 56 as illustrated by a phantom line in FIG. 2. The lever 50 is biased counterclockwise viewing in FIG. 2 to the position illustrated in FIG. 2 by means of a return spring 58 having one end fixedly anchored to a hooking arm 60 of the lever 50 and an opposite end fixedly anchored to a hooking pin 62 of the hinge member 10. The cam 48 has a nose 64 which cooperates with the notch 42 of the bearing plate 30 for disengaging the upper teeth 34 from the internal teeth 22.

The axle 16 has a flange 66 slidably abutting on the hinge member 12 and a non-circular part 68 provided with two opposite flat surfaces. This part 68 is spaced from the flange 66 and disposed in the corresponding non-circular opening 70 of the hinge member 10. The axle 16 is non-rotatably fixed to the hinge member 10 by bending a portion adjacent the non-circular part 68 of the hinge member 10 (see FIG. 3). The axle 16 has a reduced diameter portion 72 projecting from the non-circular part 68 outwardly of the hinge member 10.

The hinge member 12 is fixed to the frame 14 of the seat back together with a holder 74 by at least two, preferrably, three set pins 76. The holder 74, therefore, is fixed to the hinge member 10 with an upper actuate edge 78 of the hinge member 10 interposed between the holder 74 and the hinge member 12, holding the hinge member 10 against the hinge member 12. This arrangement ensures engagement of the upper teeth 34 with the internal teeth 22. The upper arctuate edge 78 is centered on the axle 16 for slidable cooperation with the holder 74 during adjustment of the seat back. The holder 74 is in the form of a plate having an impressed lower arcuate marginal portion 80 slidably engaging the first hinge member 10 in the vicinity of the upper arcuate edge 78.

Figure 7:
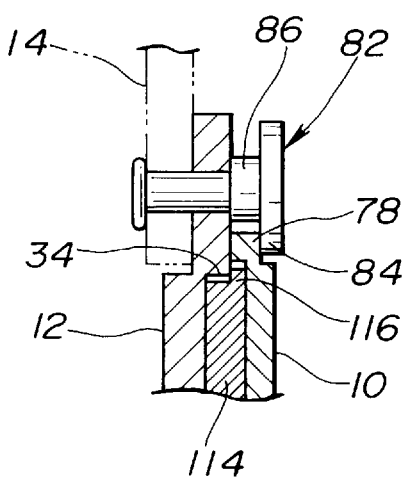
FIG. 7 is a fragmentary view of FIG. 3, showing a modification of a holder.

Alternatively, a plurality of set pins, each having an enlarged head on a spacer, constitute a holder. As shown in FIG. 7, each pin 82 has an enlarged head 84 on a spacer 86. The spacer 86 serves as a head and abuts on the hinge member 12. The enlarged head 84 of each of the pins 80 slidably engages the hinge member 10 in the vicinity of the upper actuate edge 78 during adjustment of the seat back.

The hinge members 10 and 12 are formed with impressed portions 88 and 90. The impressed portion 88 of the hinge member 10 defines on its outer periphery the upper arcuate edge 78. The impressed portion 88 partially surrounds a major inner portion 92. The major inner portion 92 is not surrounded by the impressed portion 88 at a lower part of the hinge member 10. Disposed within this major inner portion 92 is the lever 50. The impressed portion 90 of the hinge member 12 is surrounded by a major outer portion 94. The major outer portion 94 cooperates with the impressed outer portion 88 for pivotal motion of the hinge member 12 relative to the hinge member 10 about the axle 16. Disposed within the impressed inner portion 90 of the hinge member 12 are the bearing plate 30 and the cam 48.

Figure 4:
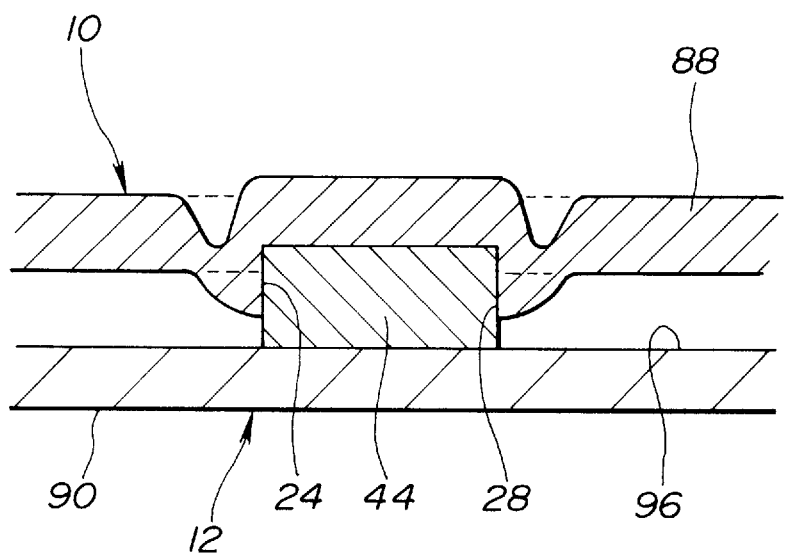
FIG. 4 is a diagrammatic view showing a portion of the adjustable hinge mount.

The major inner portion 92 of the hinge member 10 is recessed from the surrounding impressed portion 88 to receive the lever 50. The lever 50 is disposed between the major inner portion 92 of the hinge member 10 and the cam 34. The impressed portion 90 of the hinge member 12 is recessed from the surrounding major outer portion 94 to define a recessed portion 96 in which bearing plate 30 and the cam 48 are disposed. As best seen in FIG. 4, the impressed portion 88 of the hinge member 10 is provided with the two parallel guide walls 24 and 28 formed by a precision stamping and cold pressing process. The guide walls 24 and 28 extend into the recessed portion 96 for guiding the bearing plate 30.

Figure 5:
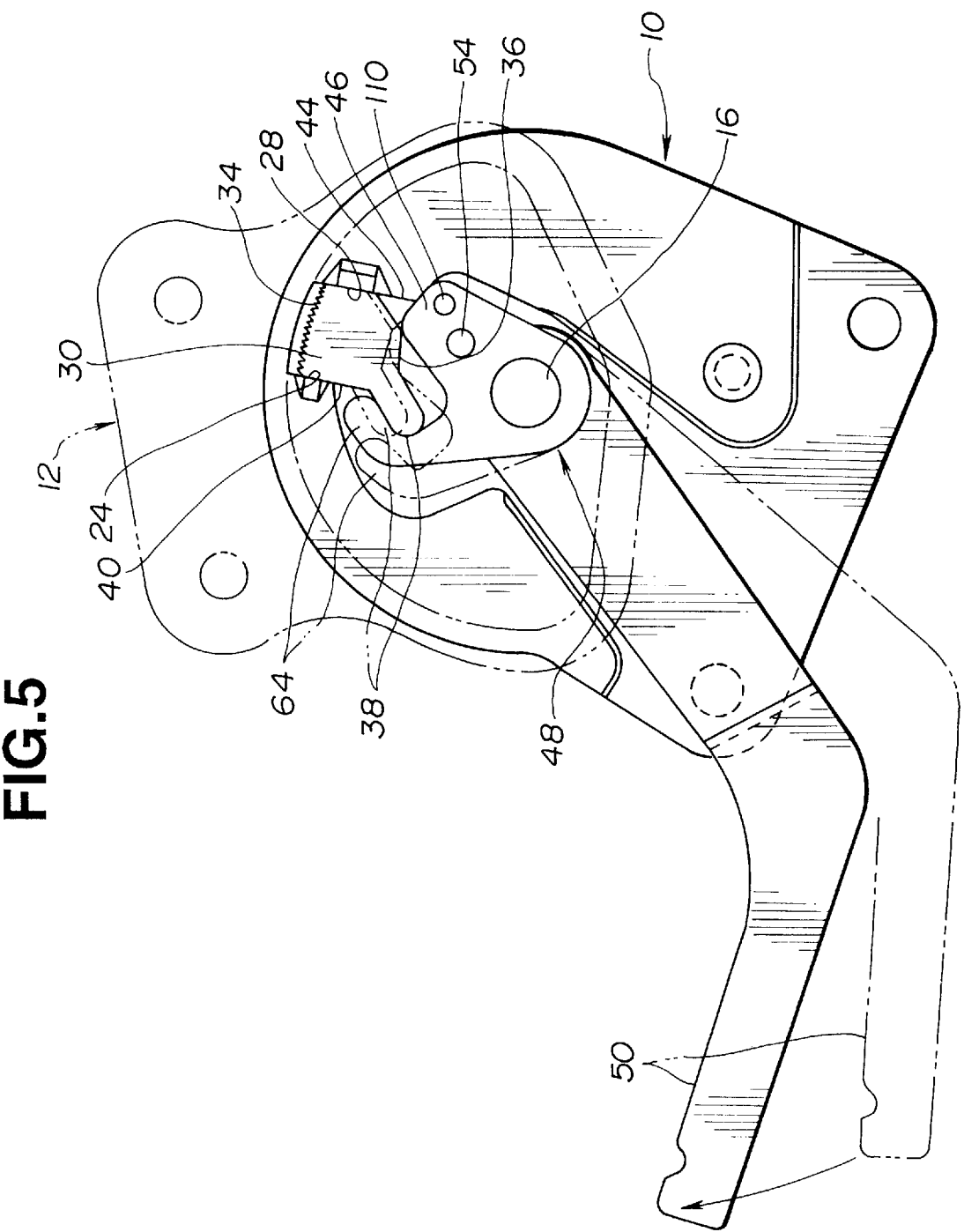
FIG. 5 is a simplified view similar to FIG. 2, showing, the parts of the adjustable hinge mount in a released position in comparison with the same parts in the locked position.

In FIG. 5, in order to clearly show the positional relationship among the lever 50, the cam 48 and the bearing plate 30, the hinge member 12 is removed and thus illustrated by the phantom line only. Referring to FIGS. 2 and 5, turning the lever 50, against action of the return spring 58, from the position illustrated in FIG. 2 to the position illustrated by fully drawn line in FIG. 5 causes the cam 48 to pivot about the axle 16, causing the nose 64 to slide on the front lug 38 toward the notch 42 to disengage the bearing plate 30. During this pivotal motion of the cam 48, the bearing plate 30 is pushed donwardly from the position illustrated by the phantom line in FIG. 5 to the position illustrated by the fully drawn line in FIG. 5 owing to the camming action of the cam 48 on the bearing plate 30, and therefore the upper teeth 34 are separated from the internal teeth 22. The hinge member 12 which is thus disengaged from the hinge member 10 can pivot in a forward direction or in a rearward direction according to the desired adjustment of the seat back.

By releasing the lever 50, the return spring 58 returns the lever 50 to the position as illustrated in FIG. 2, and the nose 64 is separated from the front lug 38 and simultaneously the elevated portion 46 of the cam 48 lifts the bearing plate 30 into firm engagement with the internal teeth 22 of the hinge member 12. The guide walls 24 and 28 and the lower surface pact 36 of the bearing plate 30 cause the bearing plate 30 to move from the position illustrated by the fully drawn line in FIG. 5 to the position as illustrated by the dashed line in FIG. 2 (or the position as illustrated by the phantom line in FIG. 5). The lower part of the front lug 38 and the lower surface part 36 of the bearing plate 30 form a double slope having a shape of an inverted V with a large opening. As long as the elevated portion 46 is applied to the lower surface part 36, the cam 48 pushes the bearing plate 30 perfectly into firm locking engagement with the internal teeth 22, and therefore the hinge member 12 is perfectly fixed with the hinge member 10, thereby providing a perfect locking of the seat back with respect to the sitting position of the seat in consideration.

If during operation and due to wear of the teeth, there is caused a slight play, it is immediately compensated since the elevated portion 46 of the cam 48 can be applied to the slope of the front lug to push the bearing plate 30 further to maintain locking engagement with the internal teeth 22, thereby avoiding any playsof the seat back with respect to the sitting position of the seat.

According to the structure shown in FIG. 4, the the bearing plate 30 can use substantially the whole thickness of the upper teeth 34 for engagement with the internal teeth 22 since the guide walls 24 and 28 are disposed in the recessed portion 96 where the internal teeth 22 are disposed. This results in a reduction in thickness of the bearing plate 30 and thus the thickness of the upper teeth 34, providing advantage in weight and manufacturing cost.

From the preceding description, it is appreciated that the bearing plate 30 is disposed above the axle 16 within a triangle-like area having one corner thereof on the axle 16 and the other two coners thereof on the remotest two mount holes receiving the set pins 76. Within this area, the upper teeth 34 are brought into and out of engagement with the internal teeth 22. Specifically, the bearing plate 30 is disposed above the axle 16 within a sector-like area centering on the axle 16 and defined by the periphery of the lower arcuate portion 80 of the holder 74 and the upper teeth teeth 34 are brought into and out of engagement with the internal teeth 22. This provides a rigid structure which can ensure and maintain proper engagement between the upper and internal teeth 34 and 22 during rear-end collision of the vehicle. During rear-end collision, the weight of the seat occupant urges the seat back rearwardly to pull the upper portion of the hinge member 12 above the axle 16 toward the hinge member 10 in such a direction to keep engagement of the upper teeth 34 with the internal teeth 22. If the hinge member 12 is inclined with the upper portion thereof above the axle 16 tending to separate from the hinge member 10, such separation is compensated by action of the holder 74 urging the upper portion of the hinge member 10 to follow the hinge member 12. Thus, the engagement of the upper teeth 34 with the internal teeth 22 can be maintained.

As is readily seen from FIG. 2, there are no parts except the hooking pin 62 mounted to the lower portion of the hinge member 10 below the axle 16. Thus, it is possible to arrange the axle 16 to a desired low height from the floor of the vehicle by suitably desigining the location of the hooking pin 62.

Where it is required to pivot a cam of a follower adjustable hinge mount for the right hand rear corner of the seat by pivoting the lever 50 of the adjustable hinge mount for the left hand rear corner, a motion transmitting pipe 100 is coupled at one end thereof with a projection 102 of the axle 16 and at the opposite end thereof with a similar projection of an axle of the follower hinge mount for rotation with respect to the hinge member 10. At the one end thereof, the pipe 100 has a lateral lug or link 104 projecting thereform in a radial direction. This lug 104 is formed with a hole 106 at a location adjacent a free end thereof. The hinge member 10 is formed with an arcuate window or slot 108 cantering on the axle 16. The window 108 is disposed in the major inner portion 92 of the hinge member 10. A motion transmitting pin 110 is disposed in the arcuate window 10. This pin 110 is conneced at one end to the cam 48 and an opposite end of the pin 110 is connected to the lateral lug 104 at the hole 106. At an opposite end, the pipe 100 is drivingly connected to the cam of the follower hinge mount in a similar manner. Thus, by pivoting the lever 50, the cam 48 causes the lateral lug 104 to turn the motion transmitting pipe 100 about the axle 16. This motion of the pipe 100 causes the cam of the follower hinge count to pivot in the same manner as the cam 48 pivots. This ensures perfect conjoint operation between both of the associated adjustable hinge mounts.

Figure 6:
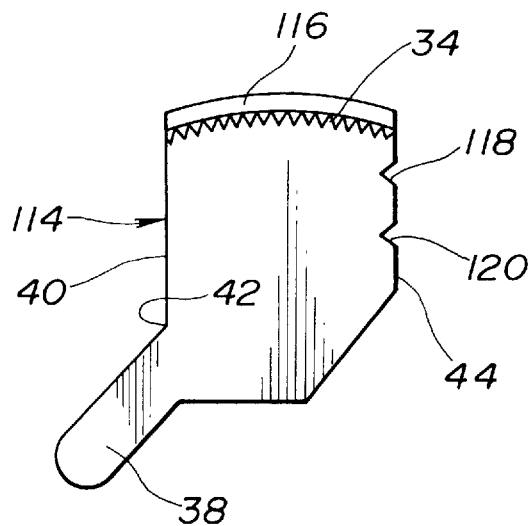
FIG. 6 is a side view of a modified bearing plate.

During rear end collision of the vehicle, the hinge member 12 is pushed rearwardly about the axle and this is applied through the locking engagement of the internal teeth 22 and the upper teeth 34 to the bearing plate 30 against the guide wall 28. Thus, the rear face 44 of the bearing plate 30 engages firmly into the guide wall 28 thereby to maintain engagement of the upper teeth 34 with the internal teeth 22. FIG. 6 illustrates an alternative embodiment to the bearing plate 30. The illustrated bearing plate 114 in FIG. 6 is substantially the same as the bearing plate 30. However, the bearing plate 114 is different from the bearing plate 30 in that the bearing plate 114 has a wall portion 116 extending along upper teeth 34 thereof and includes at least one portion recessed inwardly from a rear face 44 thereof. In this embodiment, the bearing plate 114 is recessed at two portions 118 and 120 inwardly from the rear face 44. As may be readily seen from FIG. 7 in comparison with FIG. 3, the rear face 44 of the bearing plate 114 provides an increased pressure acting area owing to the wall portion 116 particularly at a portion where the upper teeth 34 are formed. Owing to the provision of recesses 118 and 120 in the rear face 44 and the increased pressure acting area of the rear face 44, the bearing plate 114 can firmly engage with the guide wall 28 deeper than the bearing plate 30 does in the cess of application of force to the bearing plate during rear end collision of the vehicle. Thus, perfect engagement of the upper teeth 34 with the internal teeth 22 is maintained under more severe circumanstance during rear end collsion.

Figure 8:
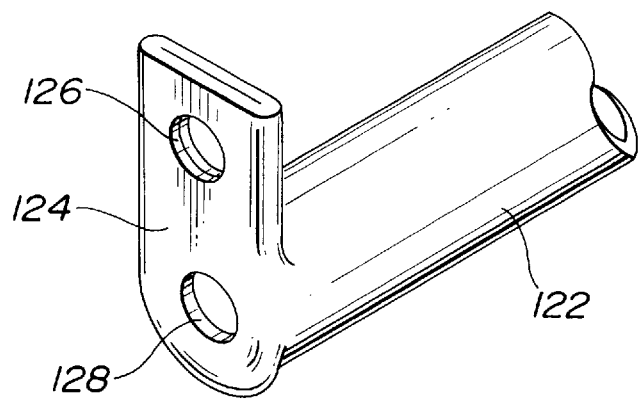
FIG. 8 is a fragmentary perspective view of an alternative of one of the parts of the adjustable hinge mount.
Figure 9:
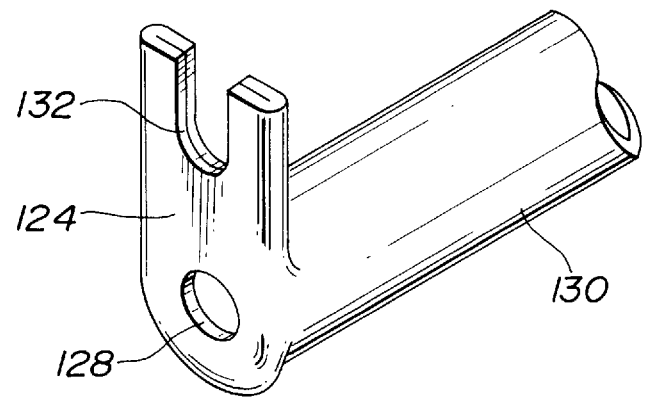
FIG. 9 is a similar view to FIG. 8, showing another alternative.

In the preceding description, the lateral lug 100 is a separate piece fixedly connected to the pipe 100 for a unitary rotation therewith. FIGS. 8 and 9 illustrate two modifications of a motion transmitting pipe.

In FIG. 8, a motion transmitting pipe 122 has each of one and opposite end portions flattend and bent to form an integral lateral lug 124. This lug 124 is formed with a hole 126 for receiving the motion transmitting pin 110 and a hole 128 concentric with the pipe 122 proper for receiving the projection 102 of the axle 16. A motion transmitting pipe 130 illustrated in FIG. 9 is substantially the same as the pipe 122 except the provision of a cutout 132 instead of the hole 126 for receiving the motion transmitting pin 110.

Figure 10:
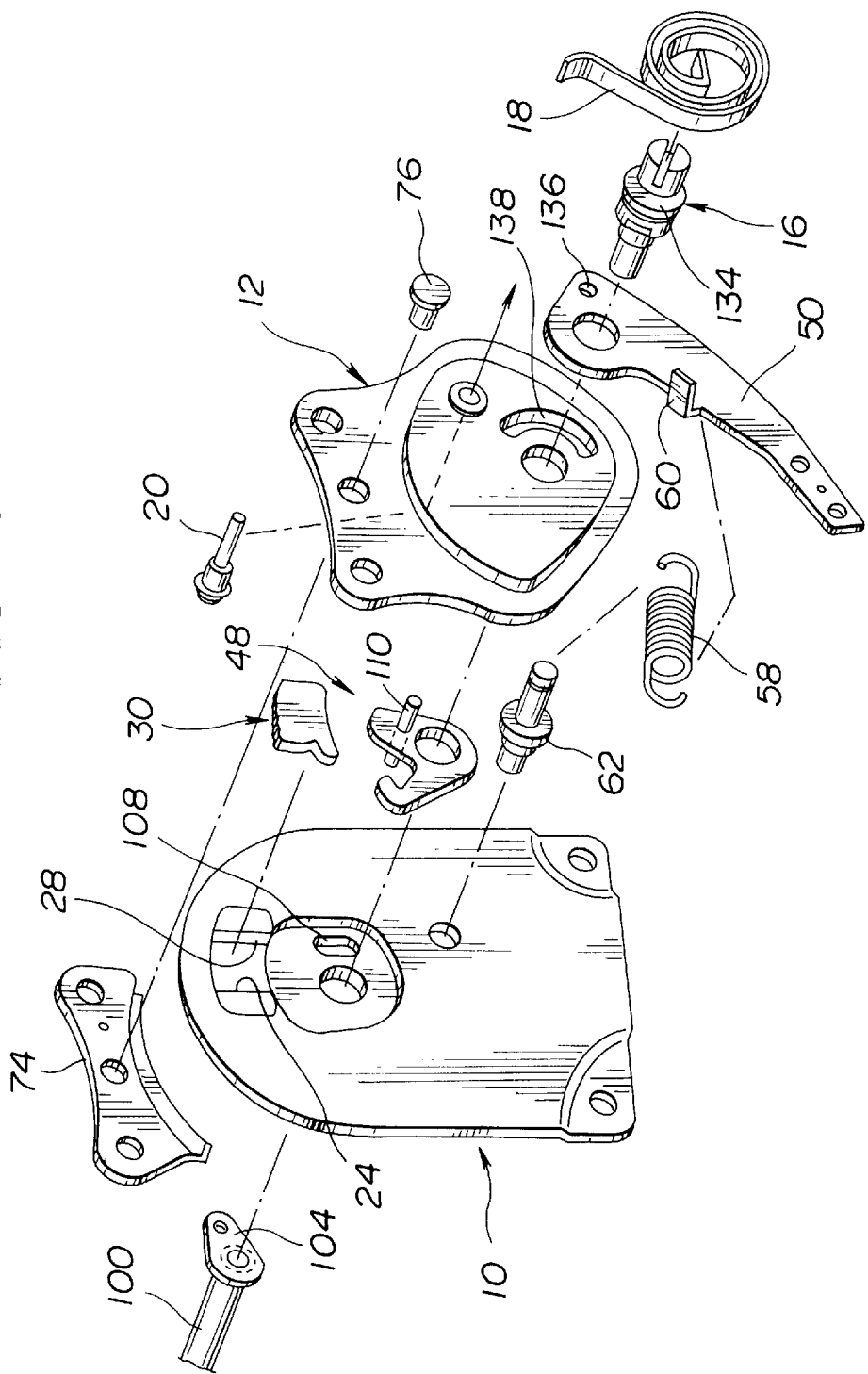
FIG. 10 is a similar view to FIG. 1, showing another embodiment of an adjustable hinge mount.

In the preceding description, the lever 50 is disposed between the hinge members 10 and 12. If desired, a lever 50 may be disposed between a hinge member 12 and a flange 134 of an axle 16 as shown in FIG. 10. In this arrangement, a motion transmitting pin 122 extends through a cam 48 and fixed thereto. The lever 50 is formed at one end thereof with a hole 136 receiving the pin 110 extending through an arcuate window 138 with which the hinge member 12 is formed. With this pin 110, the cam 48 is connected to both the lever 50 and a lateral lug 104 of a motion transmitting pipe 110. The embodiment illustrated in FIG. 10 is substantially the same as the embodiment illustrated in FIGS. 1 to 3.

Figure 11:
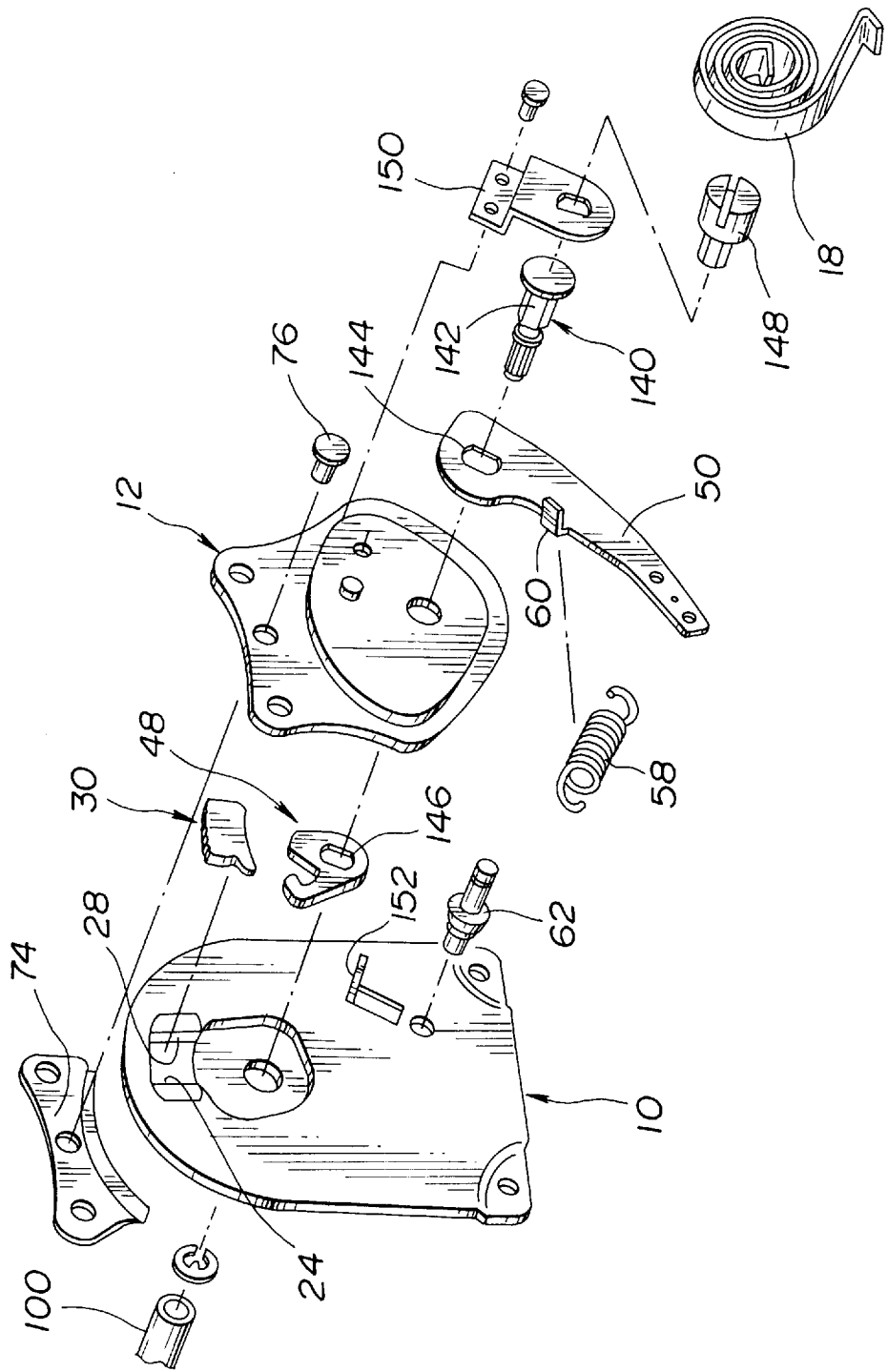
FIG. 11 is a similar view to FIG. 1, showing still another embodiment of an adjustable hinge mount.

In the preceding embodiments, the cam 48 and the lever 50 are rotatably supported on the axle and interconnected by the emboss 54 (see FIG. 1) or the motion transmitting pin 110 (see FIG. 9) and, with this pin 110, the cam 48 drives the motion transmitting pipe 100. In FIG. 11, an axle 140 interconnects a lever 50, a cam 48 and a motion transmitting pipe 100 for unitary rotation. In this arrangement, the axle 140 has a non-cicular part 142 provided with two opposite flat surfaces and a free end portion splined. The non-circular part 142 is fitted in a non-circular opening 144 of the lever 50 and also in a non-circular opening 146 of the cam 48. The motion transmitting pipe 100 is splined at one end thereof to receive the splined free end portion of the axle 140. In this arrangement, a slotted pin 148 fixed to a hinge member 12 by a bracket 150 is used to anchor or hook an inner end of a spring 18. An outer end of the spring 18 is supported on a hooking pin 152 fixed to a hinge member 10. This embodiment is substantially the same as the first embodiment shown in FIGS. 1 to 3.

Figure 12:
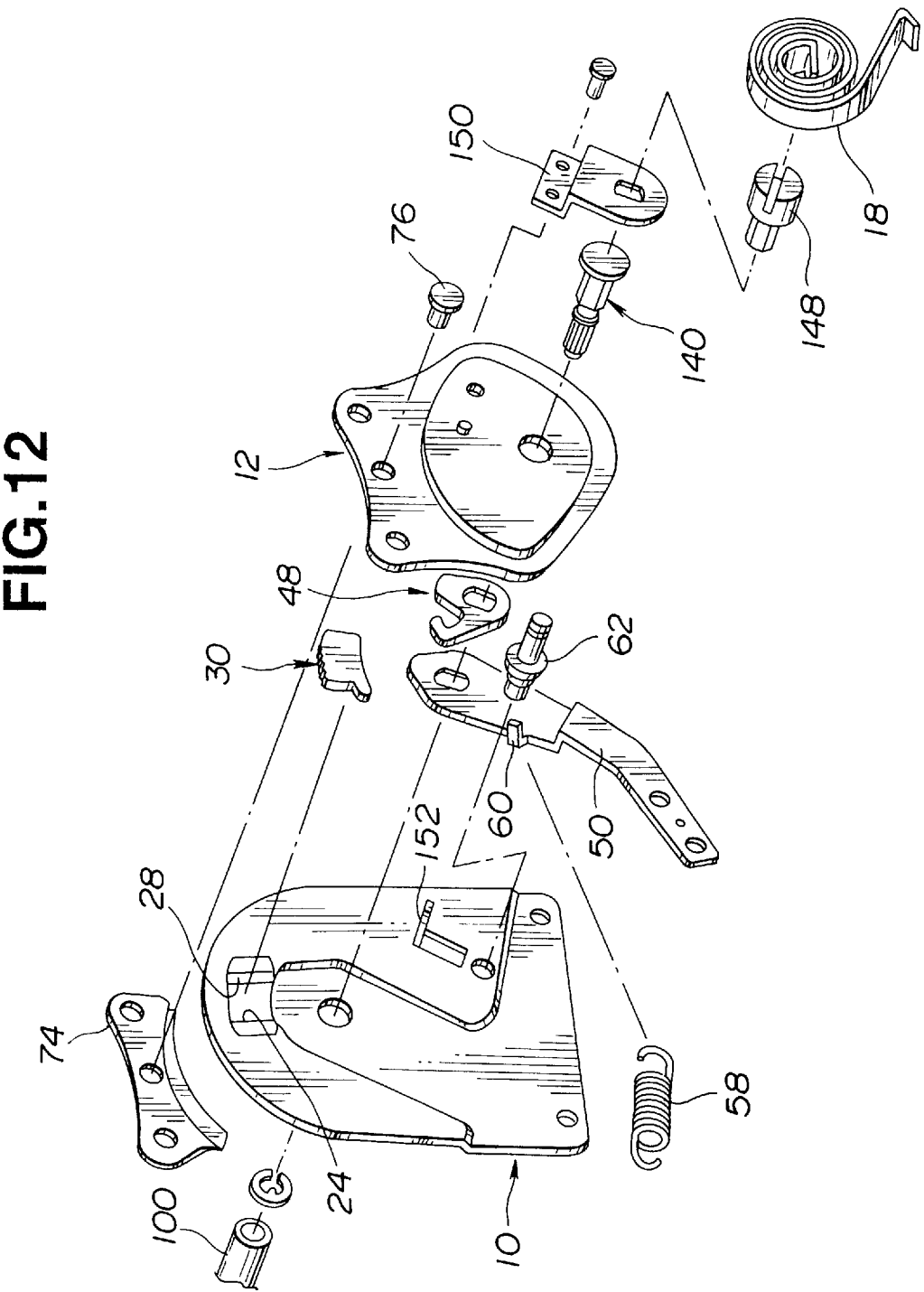
FIG. 12 is a similar view to FIG. 1, showing a further embodiment of an adjustable hinge mount.

FIG. 12 shows a modification of the embodiment of FIG. 11. This modification is different from the embodiment of FIG. 11 in that a lever 50 is disposed between hinge members 10 and 12, only.

Figure 13:
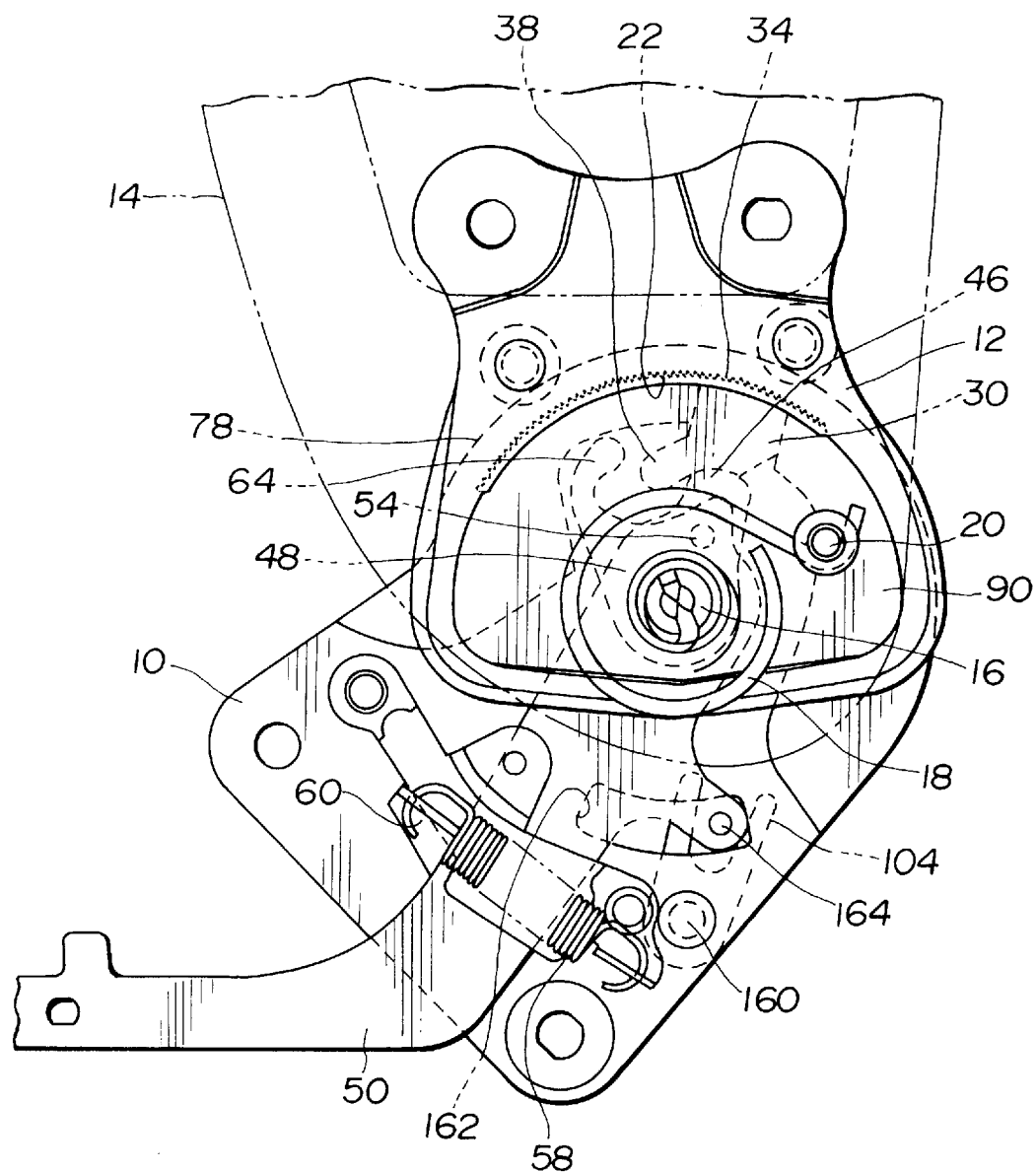
FIG. 13 is a similar view to FIG. 2, showing an adjustable hinge mount of a seat recliner.
Figure 14:
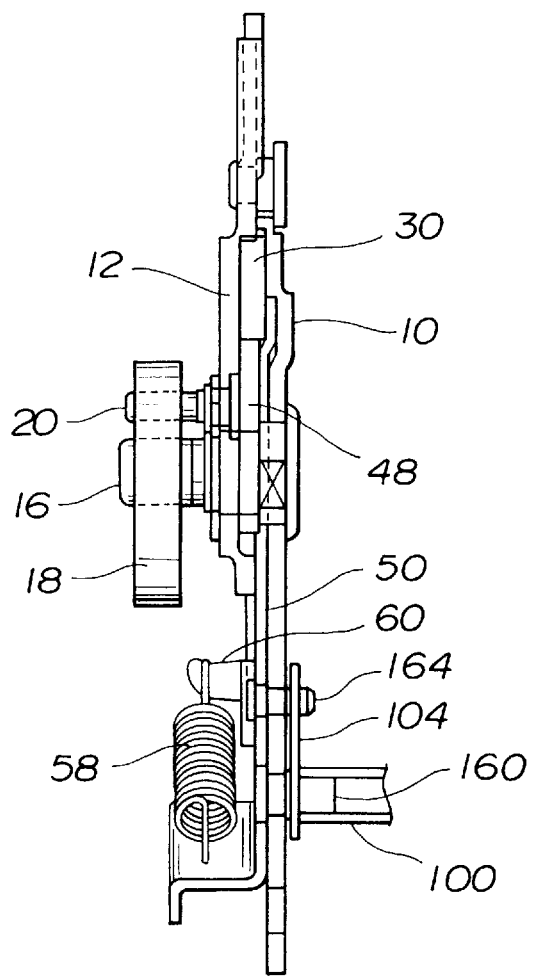
FIG. 14 is a rear view, partly broken away, of the adjustable hinge mount shown in FIG. 13.
Figure 15:
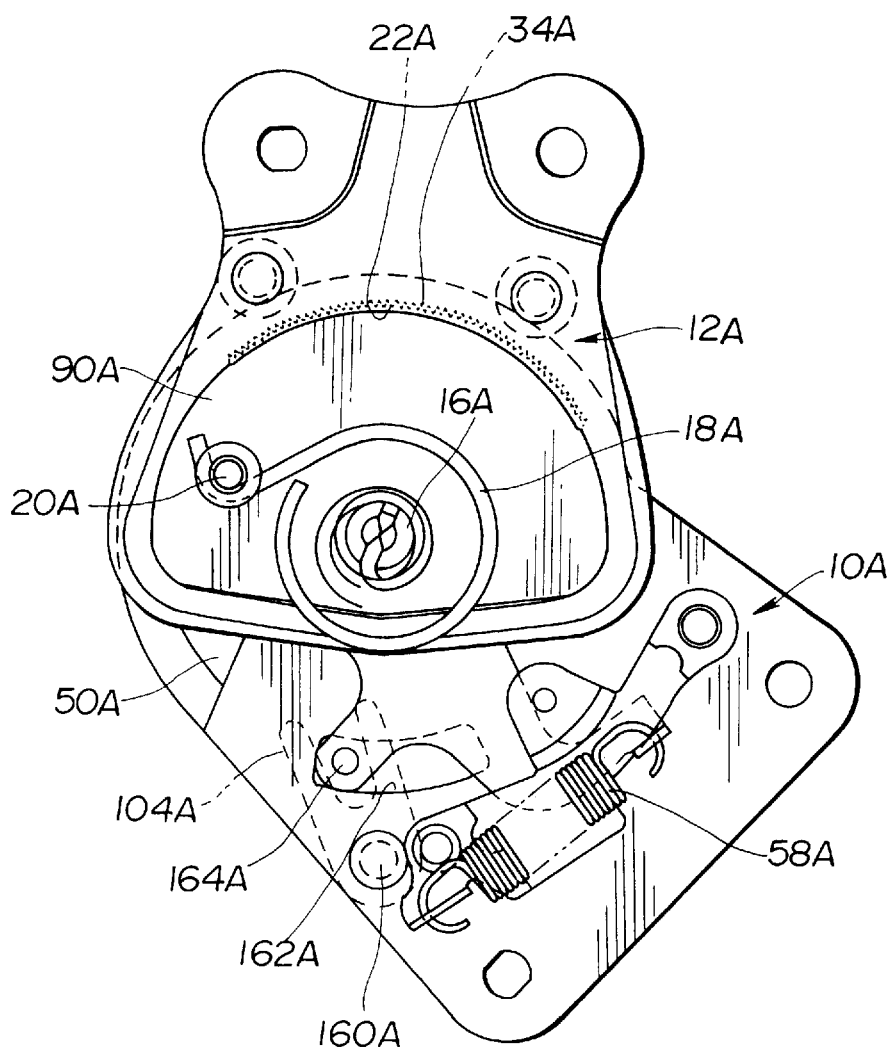
FIG. 15 is a side view of an adjustable hinge mount of the seat recliner as being mounted to right hand rear corner of the seat in joint operation with the adjustable hinge mount shown in FIG. 13.
Figure 16:
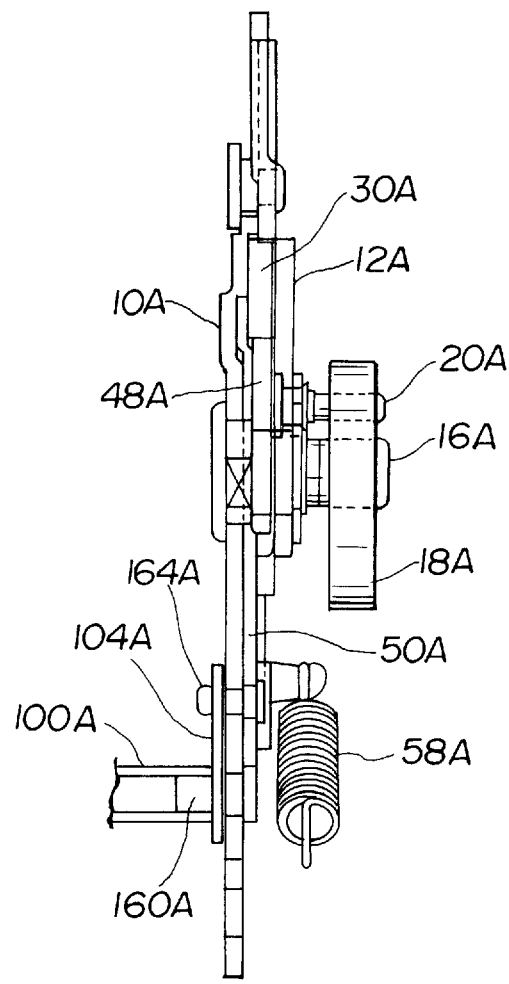
FIG. 16 is a rear view of the adjustable hinge mount shown in FIG. 15.

Referring to FIGS. 13 to 16, there is shown a seat recliner using an adjustable hinge mount of the kind described in the preceding in connection with FIGS. 1 to 3, FIGS. 13 and 14 show an adjustable hinge mount at a left hand rear corver of a seat of a vehicle, while FIGS. 15 and 16 show a similar adjustable hinge mount at a right hand rear corner of the vehicle seat. The adjustable hinge mount of FIGS. 13 and 14 is substantially the same as the hinge mount of FIGS. 1 to 3. The same reference numerals as used in FIGS. 1 to 3 are used to denote like or similar parts in FIGS. 13 and 14. The adjustable hinge mount of FIGS. 15 and 16 is substantially the same as the hinge mount of FIGS. 13 and 14. Thus, the same reference numerals as used in FIGS. 13 and 14 are used to denote like or similar parts in FIGS. 15 and 16 with a suffix A.

As best seen in FIGS. 14 and 16, a motion transmitting pipe 100 having at one end a lateral lug 104 and at an opposite end a lateral lug 104A is disposed between a hinge member 10 and a hinge member 10A. The hinge members 10 and 10A have second axles 160 and 160A, respectively. The second axle 160 is mounted to the hinge member 10 at a location distant downwardly from an axle 16, and the second axle 160A is mounted to the hinge member 10A at a location distant downwardly from an axle 16A. The second axles 160 and 160A are alinged and opposed to each other to support the motion transmitting pipe 130 at one and opposite ends thereof. The hinge members 10 and 10A are formed with arcuate windows or slots 162 and 162A, respectively. A motion transmitting pin 164 is disposed in the arcuate window 162. This pin 164 has one end fixedly carried by a lever 50 and an opposite end received in a cutout of the lateral lug 104. Another motion transmitting pin 164A is disposed in the arcuate window 162A. One end of this pin 164A is fixedly carried by a lever 50A and an opposite end thereof is received in a cutout of the lateral lug 104A. Pivoting the lever 50 causes the lateral lug 104 to turn the pipe 100 through the pin 164, and turning motion of the pipe 100 causes the lateral lug 104A to pivot the lever 50A through the pin 164A.

From the preceding description, particularly, from the descriptive portion in connection with FIGS. 2 and 5, it is appreciated that the lever 60, the cam 48 with the elevated portion 46, the lower surface part 36 and the front lug 38 of the bearing plate 30 cooperate with each other to consititute a control arrangement for controlling the motion of the bearing plate 30 into and out of engagement with the internal teeth 22.

Figure 17:
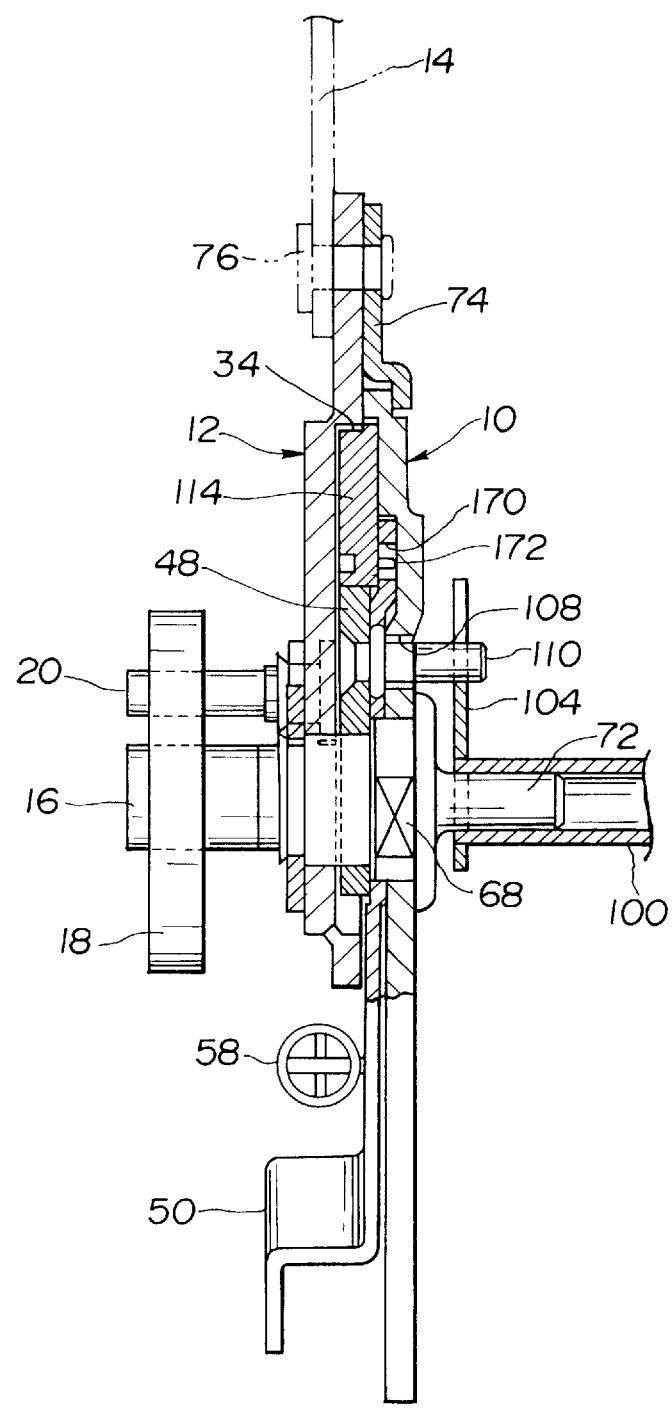
FIG. 17 is a similar view to FIG. 3, showing still further embodiment of an adjustable hinge mount.
Figure 18:
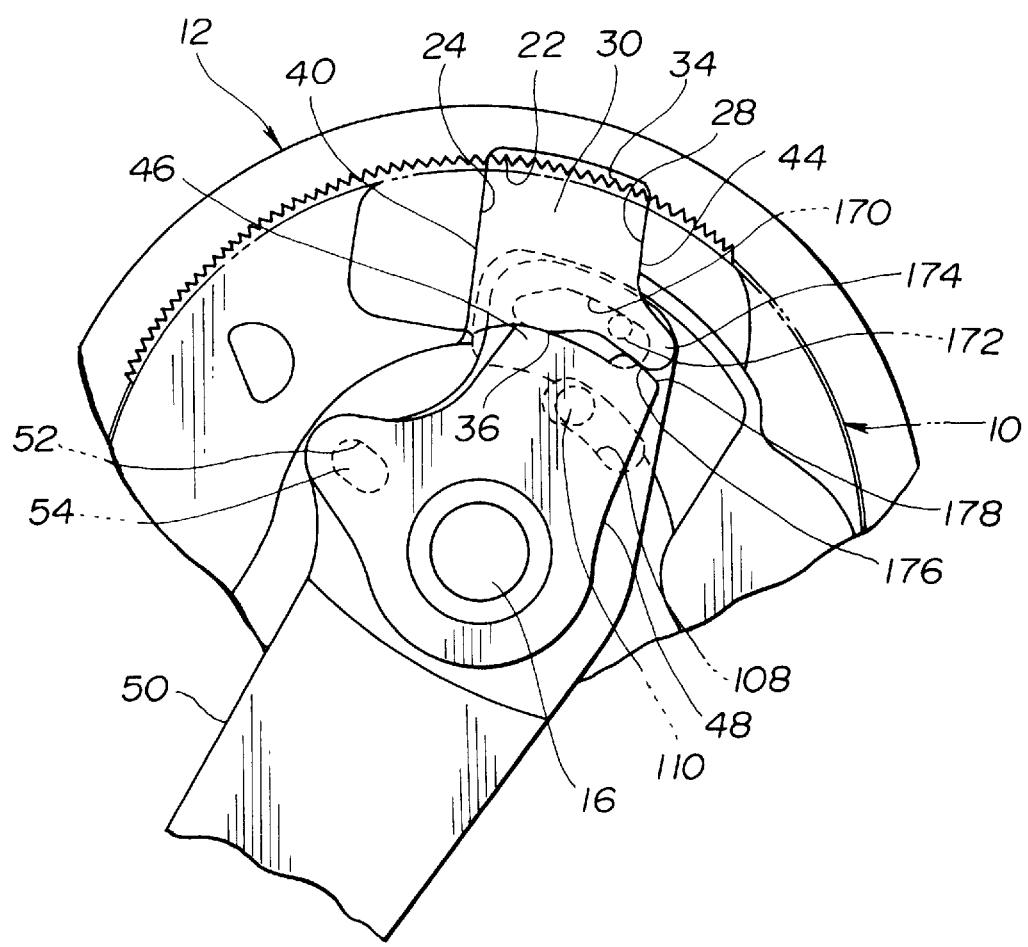
FIG. 18 is a diagrammatic view of the adjustable hinge mount of FIG. 17, showing a mechanism for controlling motion of a bearing plate into and out of engagement with an impressed internal gear, showing upper teeth of the bearing plate in engagement with the internal teeth.

Referring to FIGS. 17 and 18, the illustrated embodiment is substantially the same as the embodiment of FIGS. 1 to 3. However, a control arrangement employed in this embodiment is slightly different from the control arrangement of the embodiment of FIGS. 1 to 3. According to the control arrangement, a lever 50 is formed with a slot 170 at one end thereof and a bearing plate 30 has a pin 172 projecting therefrom into the slot 170 for engagement therewith. Pivoting motion of the lever 50 causes the pin 172 to disengage the bearing plate 30 from an internal teeth 22. Thus, the bearing plate 30 is not formed with a front lug and a cam 48 is not provided with a nose.

Figure 19:
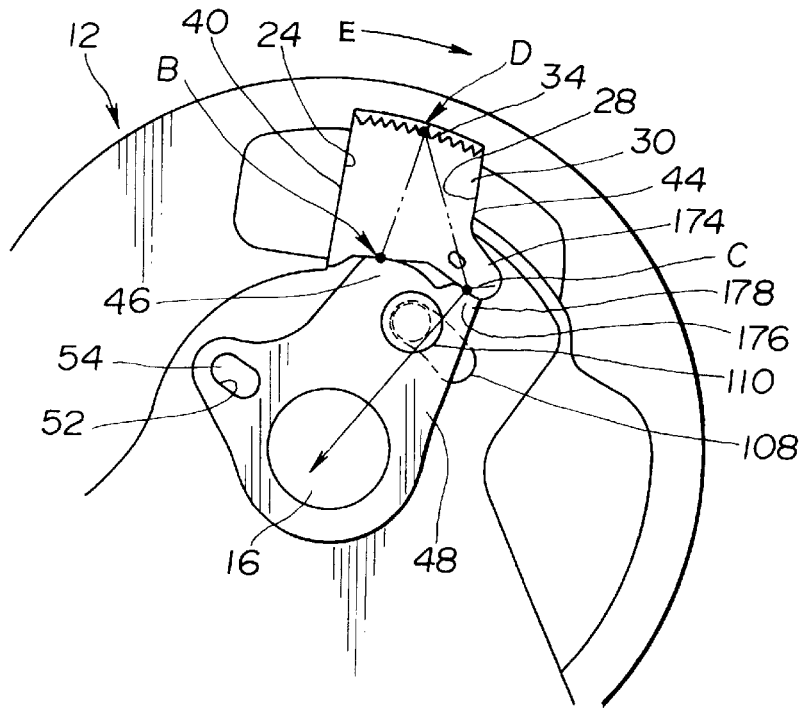
FIG. 19 is a simplified view of FIG. 18.

As shown in FIG. 18, the bearing plate 30 has a lower surface part 36 and the cam 48 has an elevated portion 46 cooperating with the lower surface part 36 for pushing the bearing plate 20 into locking engagement with the internal teeth 22 in substantially the same manner as in the embodiment of FIGS. 1 to 3. The bearing plate 30 includes a rear lug 174 projecting from a rear face 44 thereof. The rear lug 174 defines a second lower surface part 176 of the bearing plate 30. The cam 48 has a second elevated portion 178 for cooperation with the second lower surface part 176 for engaging or supporting the second lever surface part 176 thereby to prevent the bearing plate from moving out of locking engagement with the internal teeth 22 when, with upper teeth 34 in locking engagement with the internal teeth 22, a hinge member 12 is pivotably biased in a rearward direction, during rear end collision of the vehicle. As best seen in FIG. 19, the bearing plate 30 is supported at two points B and C when the hinge member 12 is piovted in the rearward direction E and the force is applied to the bearing plate 30 at a point D of the locking engagement. By supporting the bearing plate at two points B and C, the locking engagement is perfectly maintained.

Figure 20:
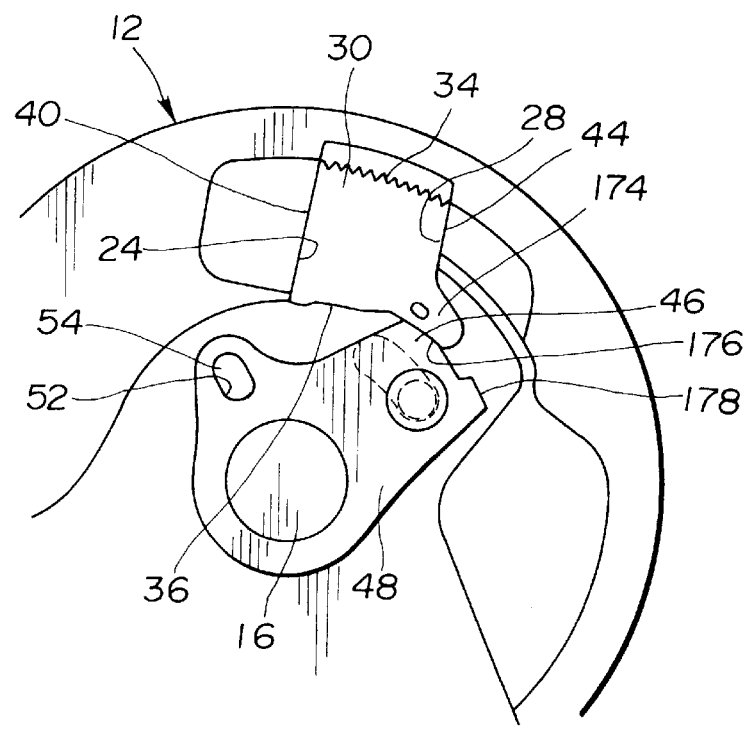
FIG. 20 is a simplified view of FIG. 18, showing the upper teeth of the bearing plate out of engagement with the internal teeth.

FIG. 20 illustrates the position of the cam 48 and the bearing plate 30 when the lever 50 is raised or lifted to a released or unlock position.

Figure 21:
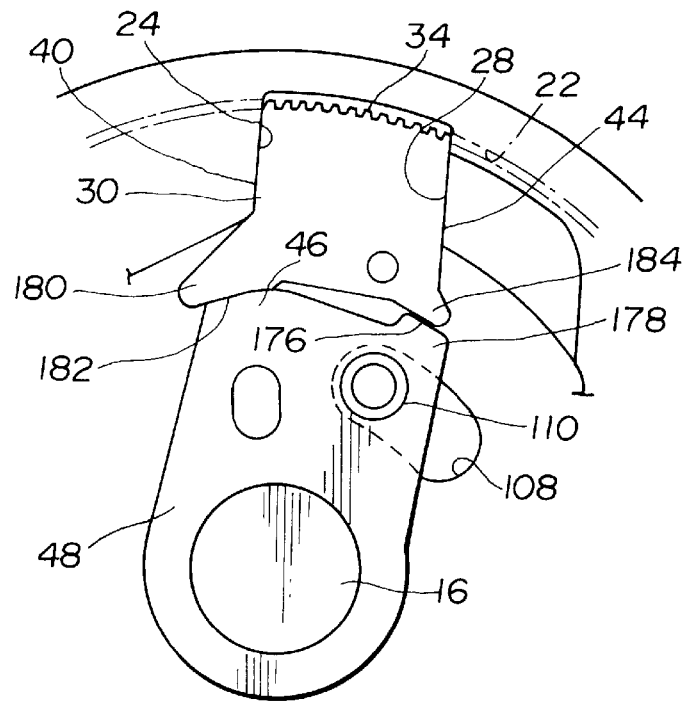
FIG. 21 is a similar view to FIG. 19, showing another control mechanism.

Referring to FIG. 21, another mechanism to push a bearing plate 30 into engagement with internal teeth 22 of a hinge member 12 is described. In this embodiment, the bearing plate 30 includes a front lug 180 projecting from a front face 40 thereof. This front lug 180 defines a first lower surface part or slope 182 which is located forwardly of the front face 40. A second lower surface part 176 of the bearing plate 30 is located below a rear face 44. A cam 48 has a first elevated portion 46 and a second elevated portion 178. The first elevated portion 46 cooperates with the first lower surface part 182 for pushing the bearing plate 30. Pushing through the first lower surface part 182 causes the bearing plate 30 to incline between two guide walls 24 and 28 into contact with the guide walls 24 and 28. Specifically, the bearing plate 30 inclines clockwise viewing in FIG. 21 and an upper edge of the rear face 44 and a lower portion of the front face 40 comes into contact with the guide walls 24 and 28, respectively, to maintain locking engagement of upper teeth 34 with internal teeth 22. Clearances between the front face 40 and the guide wall 24 and between the rear face 44 and the guide wall 28 which are needed for smooth mobility of the bearing plate 30 are closed by inclination of the bearing plate 30. There is thus obtained a safe and without clearance locking of the seat back with respect to the proper. The second elevated portion 178 is positioned below and near the second lower surface part 176 for cooperation with the second lower surface part 176 for engaging or supporting the bearing plate 30 during rear end collision. The bearing plate 30 has a rear lug 184 projecting from the rear face 44 and defining the second lower surface part 176.

Figure 22:
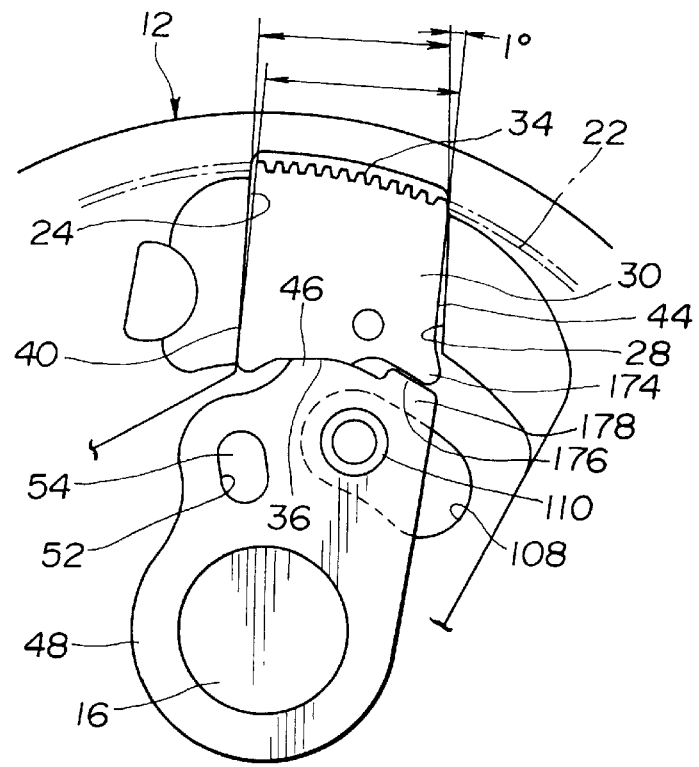
FIG. 22 is a similar view to FIG. 19, showing still another control mechanism.

The illustrated mechanism in FIG. 22 is substantially the same as the mechanism of FIGS. 18 to 20. The difference resides in relation of the guide walls 24, 28 with regard to the front and rear faces of the bearing plate 30. In the case of the embodiment sshown in FIGS. 18 to 20, the guide walls 24 and 28 are parallel to the front and rear faces 40 and 44 of the bearing plate 30 when the upper teeth 34 are in locking engagement with the internal teeth 22. However, in the case of the illustrated embodiment of FIG. 22, the spaced parallel guide walls 24 and 28 are inclined by a predetermined degree of one degree (1 degree) in the forward direction with respect to the spaced parallel front and rear faces 40 and 44 of the bearing plate 30. Owing to this arrangement, the bearing plate 30 engages at two location on the front and rear faces 40 and 44 the inclined guide walls 24 and 28, respectively, when the upper teeth 34 are in locking engagement with the internal teeth 22. For the same reason as described in connection with FIG. 21, a safe and without clearance locking of the seat back with respect to the seat proper is obtained.

Figure 23:
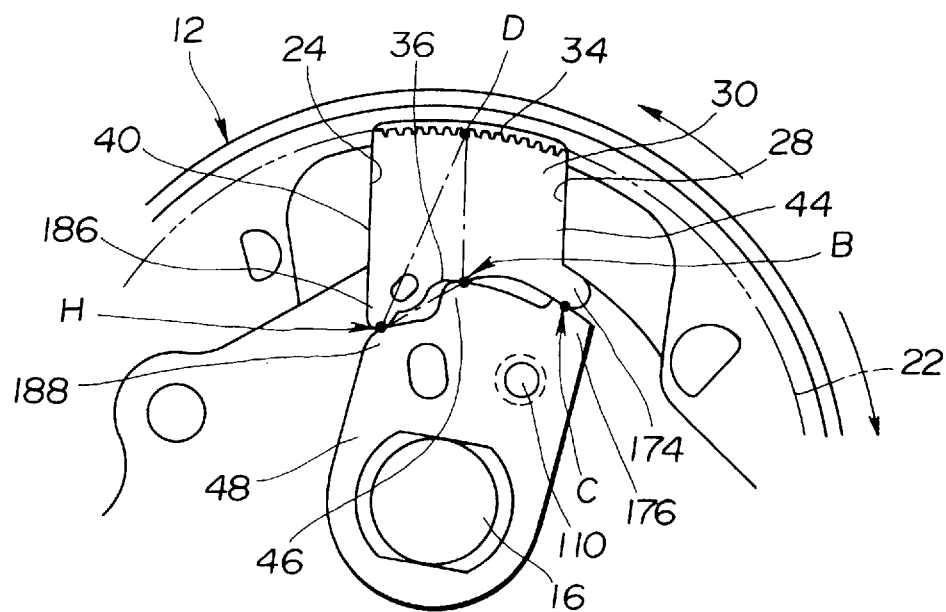
FIG. 23 is a similar view to FIG. 19, showing other control mechanism with upper teeth of a bearing plate in engagement with internal teeth.
Figure 24:
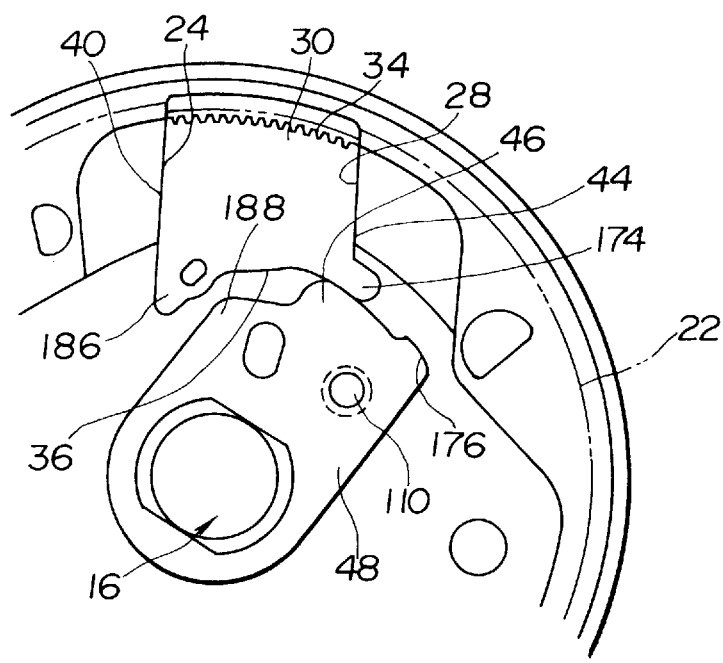
FIG. 24 shows the control mechanism shown in FIG. 23 with the upper teeth of the bearing plate out of engagement with the internal teeth.

The illustrated embodiment in FIGS. 23 and 24 is improved version of the embodiment of FIGS. 18 to 20. The improvement resides in addition of a third lower surface part 186 adjacent a front face 40 of a bearing plate 30 and addition of a third elevated portion 188 on a cam 48. The third elevated portion 188 is arranged for cooperation with the third lower surface part 186 for engaging and supporting (see point H in FIG. 23) the third lower surface part 186 to prevent the bearing plate 30 from moving out of engagement with internal teeth 22 when a hinge member 12 is pivotably biased in a forward direction E. There is maintained a safe and secured locking engagement since the bearing plate 30 is supported at two spaced points H and B when force is applied at a point D in the locking teeth. FIG. 24 shows the position of bearing plate 30 and the cam 48 in an unlocked or released position.

Figure 25:
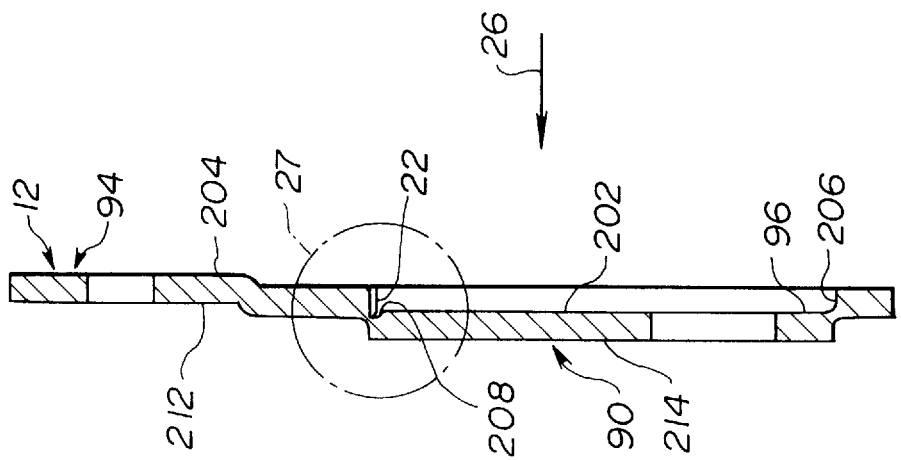
FIG. 25 is a sectional rear view of a hinge member provided with an impressed internal teeth connectable to the seat back.
Figure 26:
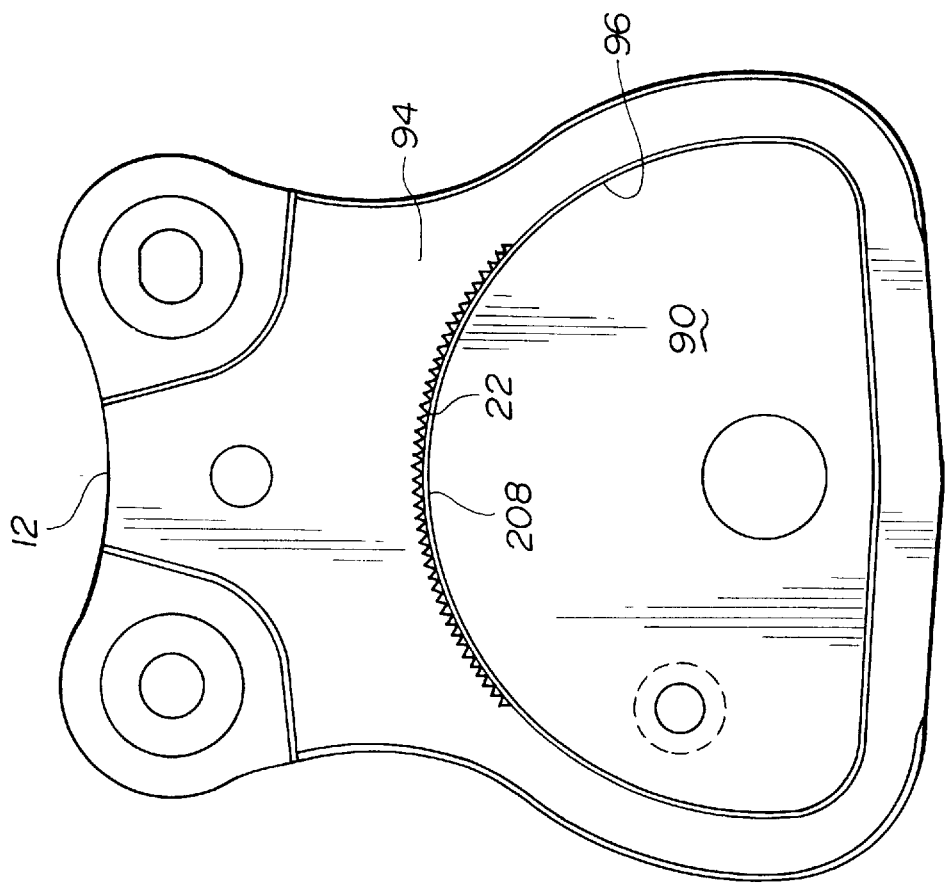
FIG. 26 is a side view of the hinge member of FIG. 25 viewing in a direction of an arrow 25.
Figure 27:
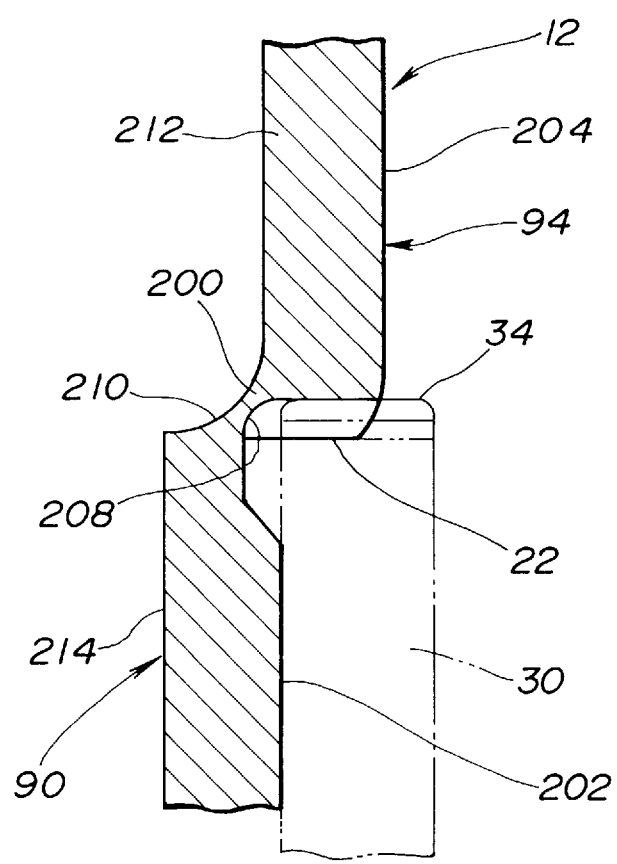
Fig. 27 is an enlarged view of a portion 27 in FIG. 25.

As seen from FIGS. 25 to 27, the hinge member 12 includes the impressed inner portion 90, the major outer portion 94 surrounding the impressed inner portion 90, and a bridge portion 200 (see FIG. 27) connecting the impressed portion 90 to the major outer portion 94. An inner surface 202 of the impressed portion 90 is recessed from an inner surface 204 of the major outer portion 94 to cooperate with an inner periphery 206 of the major outer portion 94 to define the recessed portion 96. The internal teeth 22 are formed in the inner periphery 206 of the major outer portion 94. The beidge portion 200 has a rounded inner transition wall 208 connecting the inner periphery 206 of the major outer portion 94 to the inner surface 202 of the impressed portion 90 at least in the region where the internal teeth 22 are formed. The rounded inner transition wall 208 is recessed from the inner surface 202 of the impressed portion 90. The bridge portion 200 has a rounded outer transition wall 210 connecting an outer surface 212 of the major outer portion 94 to an outer surface 214 of the impressed portion 90. The rounded outer transition wall 210 is recessed toward the rounded inner transition wall 208. The rounded outer transition wall 210 connects smoothly to the outer surface 212 of the major outer portion 94.

Figure 28:
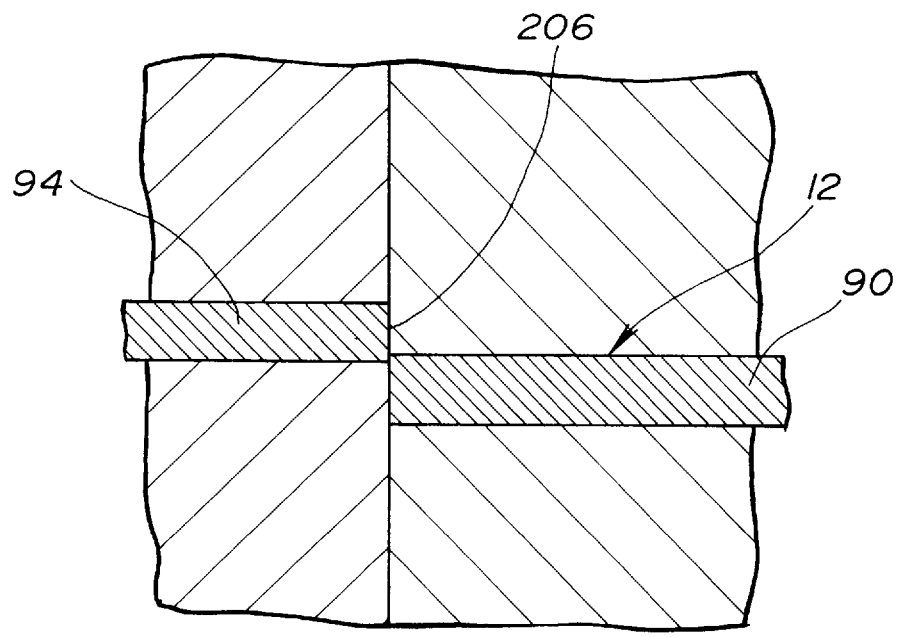
FIG. 28 is a diagrammatic view of a stamping process of a method of manufacturing internal teeth in a flat wall of a hinge member.
Figure 29:
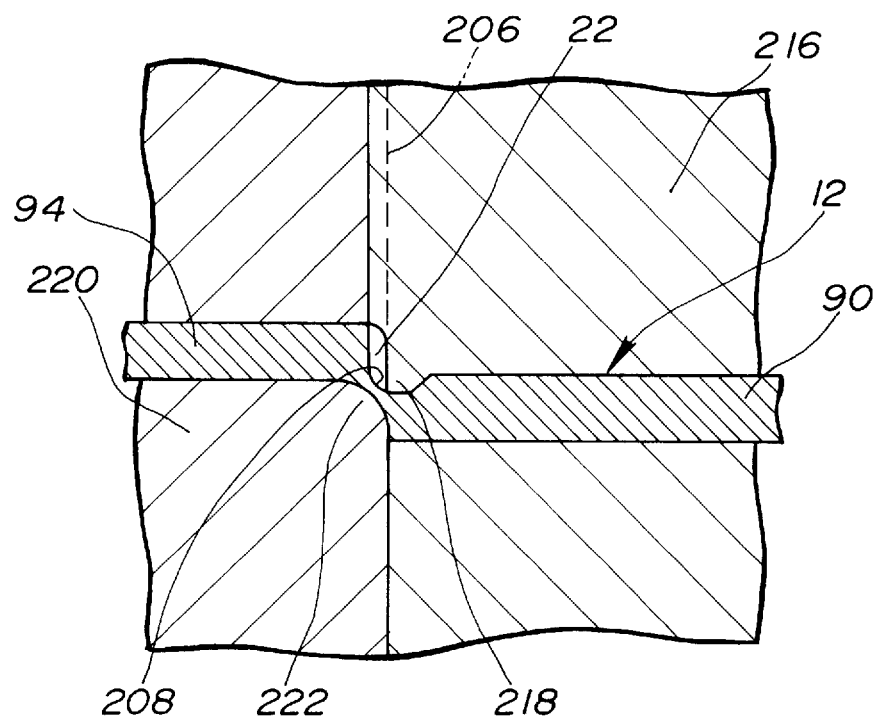
FIG. 29 is a diagrammatic view of a precision stamping process and a continuous cold pessing process.

The method of manufacturing the impressed portion 90 in the hinge member 12 and providing the impression with the internal teeth 22 includes a preliminary stamping process as shown in FIG. 28 and a precision stamping process simultaneously with a cold pressing as shown in FIG. 29. By using the preliminary stamping process (see FIG. 28), a flat wall is impressed to form the impressed portion 90 surrounded by the inner periphery 206 of the major outer portion 94. By using the combination of the precision stamping simultaneously with a cold pressing using a special punch 216 with a rounded buldge 218 and a special die 220 with a rounded corner 222, it is possible to increase the structural strength of the bridge portion 200 by forging. Owing to the rounded recess or inner transition wall 208 formed at root of the internal teeth 22, stress concentration can be avoided. Stress concentration at the bridge portion 200 can be avoided due to the rounded inner and outer transision walls 208 and 210.

Figure 30:
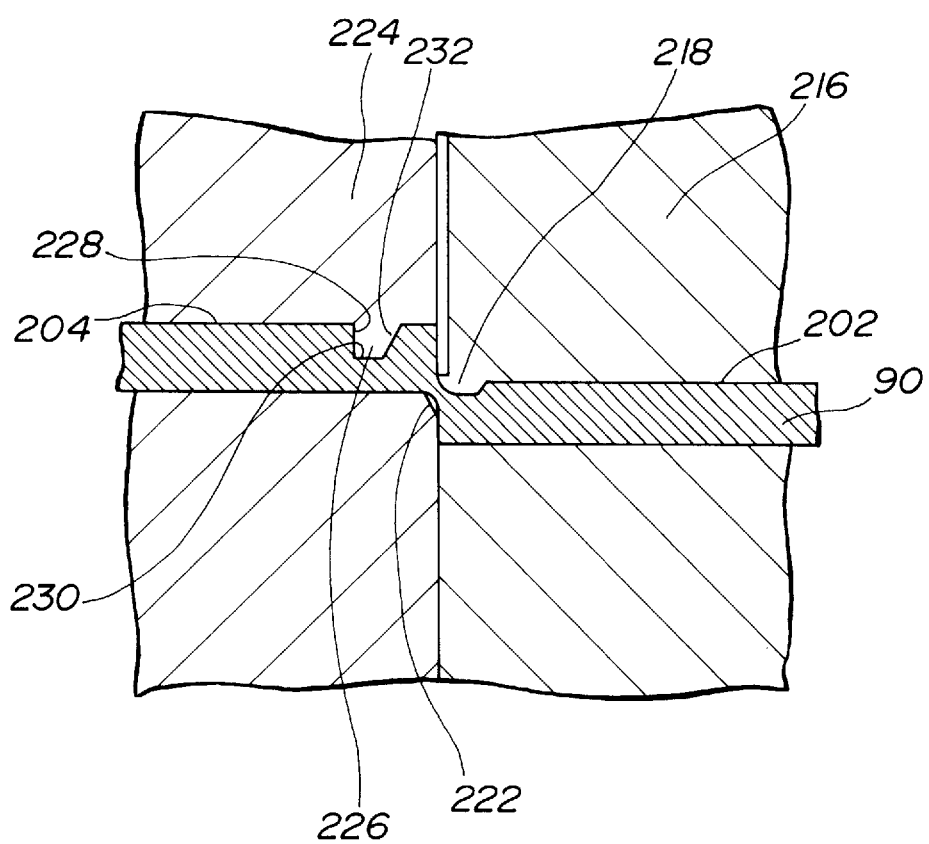
FIG. 30 is a diagrammatic view of a modified precision stamping process and a continuous cold pressing process of the manufacturing method.

By using a pressure block 224 with a wedge 226 in combination with the die 220 in the precision stamping with a cold pressing, there occurs shifting of material toward the internal teeth 22 resulting in producing the increased, in strength, internal teeth. During the cold pressing process, the inner surface 202 of the major outer portion 94 is depressed to facilitate the shifting of material toward the internal teeth 22. Thus, the product producing by this process shown in FIG. 30 has a depressed portion 228 along the inner periphry of the major outer portion 94. The depressed portion 228 has an inner surface 230 recessed from the inner surface 204 of the major outer portion 94 and connected to the inner periphery 206 by a slope 232.

Figure 33:
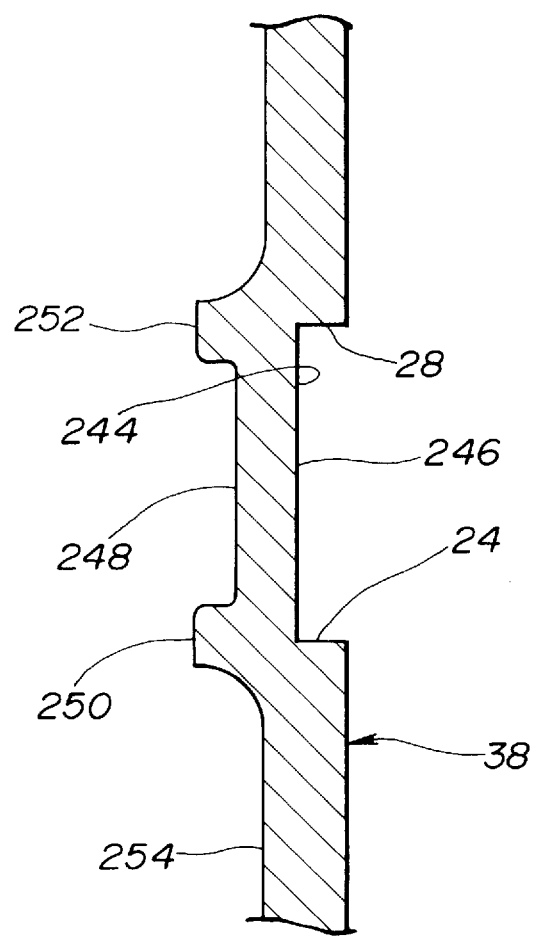
FIG. 33 is a sectional view, on an enlarged scale, taken through the line 33—33 in FIG. 32.

As seen from FIGS. 31 to 33, the hinge member 10 includes the major inner portion 92 and the impressed outer portion 88 partially surrounding the major inner portion 92. The impressed portion 88 has an outer surface 240 raised from an outer surface 242 of the major inner portion 92. The impressed portion 88 has a depressed section 244 having a surface 246 recessed from the outer surface 240 of the impressed portion 88 to form the two spaced guide walls 24 and 28. The depressed section 244 has an opposite surface 248 (see FIG. 33). The impressed portion 88 has bridge walls 250 and 252 connecting the opposite surface 248 to the adjacent portions of an inner surface 254 of the impressed portion 88, respectively. The bridge walls 250 and 252 extend along the two guide walls 24 and 28, respectively, and elevated from the opposite surface 248 of the depressed section 244 and also from the adjacent portions of the inner surface 254 of the impressed portion 240. A thickness of the depressed section 244 is less than a thickness of the impressed portion 88. The first mentioned surface 244 of the depressed section 244 is recessed from an outer surface 256 of the major inner portion 92 of the hinge member 10.

Figure 34:
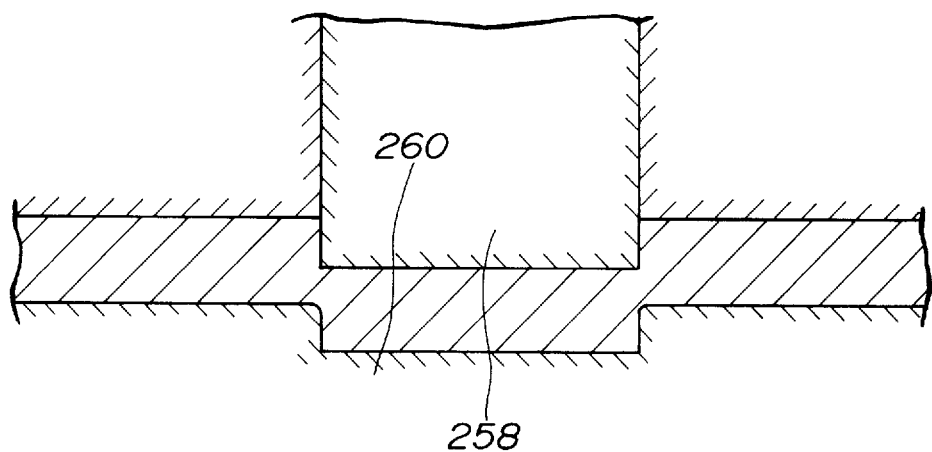
FIG. 34 is a diagrammatic view of a stamping process of a method of manufacturing two spaced guide walls in a flat wall of a hinge member.
Figure 35:
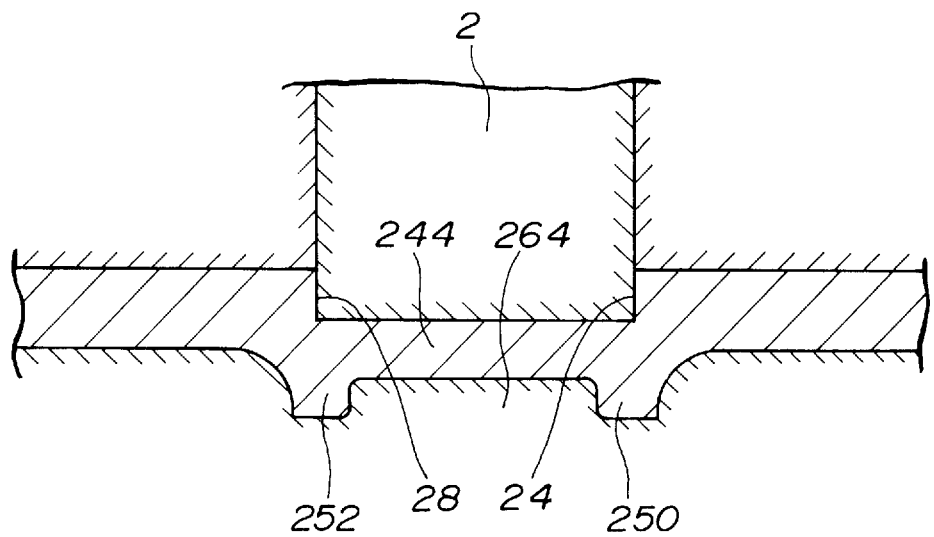
FIG. 35 is a diagrammatic view of a precision stamping process and a continuous cold pressing process of the manufacturing method.

The method of forming two spaced guide walls in a flat wall of the hinge member 10 includes a preliminary stamping process (see FIG. 34) and a precision stamping process with a cold pressing (see FIG. 35). During the preliminary stamping process, an emboss is produced by pressing by using a punch 258 and a die 260. By using a punch 262 and a specially designed die 264 in the precision stamping process with cold pressing, the embossed portion is depressed to form the depressed section 244 with the elevated bride walls 250 and 252 on the opposite surface 248 of the depressed section 244.

What is claimed is:

1. An adjustable hinge mount for a seat having a seat proper and a seat back adjustable relative to the seat proper, comprising:

a first hinge member adapted to be fixed to the seat proper;

a second hinge member adapted to be fixed to the seat back;

an axle interconnecting said first and second hinge members;

a spring coupled between said first and second hinge members for pivotally biasing said second hinge member in one direction about said axle relative to said first hinge member;

internal teeth formed in said second hinge member along an arcuate surface thereof, centered on said axle;

a bearing plate having upper teeth, which lockingly cooperate with said internal teeth, said bearing plate having first and second lower surface parts and front and rear faces;

wherein said first hinge member has spaced guide walls for guiding said bearing plate in reciprocal directions relative to said guide walls, said guide walls slidably cooperating with said front and rear faces of said bearing plate; and control members for controlling the motion of said bearing plate into and out of engagement with said internal teeth, said control members including a lever pivotally connected to said first hinge member and a cam in unitary motion with said lever for camming said upper teeth of said bearing plate into engagement with said internal teeth of said second hinge member, wherein said cam has a first elevated portion cooperating with said first lower surface part for pushing said bearing plate into locking engagement with said internal teeth, and a second elevated portion cooperating with said second lower surface part for engaging said second lower surface part to prevent said bearing plate from moving out of locking engagement with said internal teeth when, with said bearing plate in locking engagement with said internal teeth, said second hinge member is pivotally biased.

2. An adjustable hinge mount as claimed in claim 1, wherein said lever has a slot at said one end thereof and said cam includes a pin engaging in said slot, wherein pivoting said lever causes said bearing plate to disengage from said internal teeth.

3. An adjustable hinge mount as claimed in claim 2, wherein said second hinge member has an impressed inner portion and a major outer portion surrounding said impressed inner portion and a bridge portion connecting said impressed portion to said major outer portion, wherein an inner surface of said impressed portion is recessed from an inner surface of said second hinge member to cooperate with an inner peripheral surface of said major outer portion to define a recessed portion, and wherein said internal teeth are formed in said inner peripheral surface of said major outer portion.

4. An adjustable hinge mount as claimed in claim 1, wherein said bearing plate includes a rear lug projecting from said rear face thereof, said rear lug defining said second lower surface part.

5. An adjustable hinge mount as claimed in claim 4, wherein said bearing plate has a third lower surface part and said cam has a third elevated portion cooperating with said third lower surface part for engaging said third lower surface part to prevent said bearing plate from moving out of locking engagement with said internal teeth when, with said bearing plate in locking engagement with said internal teeth, said second hinge member is pivotally biased in said one direction, which is a forward direction.

6. An adjustable hinge mount as claimed in claim 1, wherein said bearing plate includes a front lug projecting in said one direction from said front face thereof, said front lug defining said second lower surface part, wherein pushing said bearing plate through said first lower surface part causes said bearing plate to incline between said guide walls into engagement with said guide walls.

7. An adjustable hinge mount as claimed in claim 1, wherein said guide walls are parallel to said front and rear faces of said bearing plate, respectively.

8. An adjustable hinge mount as claimed in claim 1, wherein said guide walls are inclined with respect to said front and rear faces of said bearing plate, when said bearing plate is in locking engagement with said internal teeth.

9. An adjustable hinge mount as claimed in claim 8, wherein said guide walls are inclined in said forward direction by a predetermined degree with respect to said front and rear faces of said bearing plate, respectively.

10. An adjustable hinge mount as claimed in claim 9, wherein said predetermined degree is one degree.

11. An adjustable hinge mount as claimed in claim 1, wherein said lever and said cam are pivotally mounted about said axle.

12. An adjustable hinge mount as claimed in claim 1, wherein said cam is supported on said axle.

13. An adjustable hinge mount as claimed in claim 12, wherein said bearing plate has a front lug projecting from the front face of said bearing plate, wherein said cam has a nose cooperating with said front lug for disengaging said upper teeth from said internal teeth.

14. An adjustable hinge mount as claimed in claim 2, wherein said second hinge member has an impressed portion with said internal teeth, an inner surface of said impressed portion is recessed from an inner surface of said second hinge member to define a recessed portion, and wherein said guide walls project from said first hinge member into said recessed portion of said second hinge member.

15. An adjustable hinge mount as claimed in claim 12, wherein said bearing plate includes at least one portion recessed inwardly from one of said front and rear faces thereof.

16. An adjustable hinge mount as claimed in claim 12, wherein said bearing plate includes a plurality of portions recessed inwardly from said rear face thereof.

17. An adjustable hinge mount as claimed in claim 12, wherein said bearing plate has a wall portion extending along said upper teeth.

18. An adjustable hinge mount as claimed in claim 1, wherein said second hinge member is formed with at least two spaced fitting holes through which said second hinge member is adapted to be fixed to the seat back, wherein said internal teeth are arranged within a substantially triangular area having corners thereof formed on said axle and said two mount holes, wherein said bearing plate is arranged above said axle, and wherein said internal teeth and said upper teeth are arranged within said triangular area.

19. An adjustable hinge mount as claimed in claim 1, wherein said first hinge member has an arcuate portion centering on said axle, wherein a holder is fixed to said second hinge member with an arcuate upper edge of said first hinge member interposed between said holder and said second hinge member for holding said first hinge member against said second hinge member, wherein said bearing plate is arranged within a sector-like area centering on said axle and defined by said arcuate upper edge, and wherein said internal teeth and said upper teeth cooperate to engage and disengage within said sector-like area.

20. An adjustable hinge mount as claimed in claim 19, wherein said holder is in the form of a plate having an impressed lower arcuate marginal portion slidably engaging said first hinge member in the vicinity of said arcuate upper edge thereof.

21. An adjustable hinge mount as claimed in claim 19, wherein said holder includes a plurality of set pins having enlarged heads thereof slidably engaging said arcuate portion.

22. An adjustable hinge mount as claimed in claim 1, wherein said axle is rotatably supported by said first hinge member, said cam is supported on said axle for rotation therewith, and said lever is supported on said axle for rotation therewith.

23. An adjustable hinge mount as claimed in claim 22, wherein said lever is disposed between said cam and said first hinge member, and wherein said first hinge member has a portion to receive said lever.

24. An adjustable hinge mount as claimed in claim 22, wherein said axle includes a flange, and wherein said lever is disposed on an outer surface of said second hinge member and between said second hinge member and said flange of said axle.

25. A seat recliner as claimed in claim 24, wherein said motion transmitting pipe is supported on said axle by spline connection.

26. An adjustable hinge mount as claimed in claim 1, wherein said second hinge member includes an impressed inner portion, a major outer portion surrounding said impressed inner portion, and bridge portion connecting said impressed portion to said major outer portion, wherein an inner surface of said impressed portion is recessed from an inner surface of said major outer portion to cooperate with an inner peripheral surface of said major outer portion to define a recessed portion, wherein said internal teeth are formed in said inner periphery of said major outer portion, wherein said bridge portion has a rounded inner transition wall connecting said inner periphery of said major outer portion to said inner surface of said impressed portion at least in the region where said internal teeth are formed, said rounded inner transition wall being recessed from said inner surface of said impressed portion, and wherein said bridge portion has a rounded outer transition wall connecting an outer surface of said major outer portion to an outer surface of said impressed portion, said rounded outer transition wall being recessed toward said rounded inner transition wall.

27. An adjustable hinge mount as claimed in claim 26, wherein said rounded outer transition wall connects smoothly to said outer surface of said major outer portion.

28. An adjustable hinge mount as claimed in claim 27, wherein said major outer portion includes a depressed portion along said inner periphery thereof, wherein an inner surface of said depressed portion is recessed from said inner surface of said major outer portion and connected to said inner periphery of said major outer portion by a slope.

29. An adjustable hinge mount as claimed in claim 1, wherein said first hinge member includes a major inner portion and an impressed outer portion partially surrounding said major inner portion.

30. An adjustable hinge mount as claimed in claim 29, wherein said impressed portion has an outer surface raised from an outer surface of said major inner portion.

31. An adjustable hinge mount as claimed in claim 30, wherein said impressed portion has a depressed section having a first surface recessed from said outer surface of said impressed portion to form said spaced guide walls.

32. An adjustable hinge mount as claimed in claim 31, wherein said depressed section has an opposite surface, wherein said impressed portion has bridge walls connecting said opposite surface to the adjacent portions of an inner surface of said impressed portion, respectively, and wherein said bridge walls extend along said parallel guide walls, respectively and elevated from said opposite surface of said depressed section and from said adjacent portions of said inner surface of said impressed portion.

33. An adjustable hinge mount as claimed in claim 32, wherein a thickness of said depressed section is less than a thickness of said impressed portion.

34. An adjustable hinge mount as claimed in claim 33, wherein said first surface of said depressed section is recessed from an outer surface of said major inner portion of said first hinge member.

35. An adjustable hinge mount as claimed in claim 1, wherein said lever has a slot at said one end thereof and said bearing plate includes a pin engaged in said slot, said slot and said pin cooperating to disengage said bearing plate from said internal teeth when said lever is pivoted.

36. An adjustable hinge mount as claimed in claim 1, wherein said bearing plate includes a front lug projecting in said forward direction from the front face, said front lug defining said first lower surface part, said front lug engaging said first elevated portion on said first lower surface part to incline said bearing plate between said guide walls into engagement with said guide walls when said bearing plate is pushed into locking engagement with said internal teeth.

37. A seat recliner comprising:

a first hinge member adapted to be fixed to a seat proper and formed with a window;

a second hinge member adapted to be fixed to a seat back;

an axle interconnecting said first and second hinge members;

a spring coupled between said first and second hinge members for pivotally biasing said second hinge member in one direction about said axle relative to said first hinge member;

internal teeth formed in said second hinge member along an arcuate surface thereof, centered on said axle;

a bearing plate having upper teeth, which lockingly cooperate with said internal teeth, said bearing plate having first and second lower surface parts and front and rear faces, wherein said first hinge member has spaced guide walls for guiding said bearing plate in reciprocal directions relative to said guide walls, said guide walls slidably cooperating with said front and rear faces of said bearing plate;

control members for controlling the motion of said bearing plate into and out of engagement with said internal teeth, said control members including a lever pivotally connected to said first hinge member and a cam in unitary motion with said lever for camming said upper teeth of said bearing plate into engagement with said internal teeth of said second hinge member;

a motion transmitting pipe rotatably mounted to said first hinge member, said motion transmitting pipe having a lug projecting therefrom in a radial direction; and a motion transmitting pin disposed in said window, said motion transmitting pin being fixed at one end thereof to said cam and having an opposite end drivingly engaging said lug, wherein said cam has a first elevated portion cooperating with said first lower surface part for pushing said bearing plate into locking engagement with said internal teeth, and a second elevated portion cooperating with said second lower surface part for engaging said second lower surface part to prevent said bearing plate from moving out of locking engagement with said internal teeth when, with said bearing plate in locking engagement with said internal teeth, said second hinge member is pivotally biased.

38. A seat recliner as claimed in claim 37, wherein said lug has a cutout inwardly from said opposite end thereof, said cutout receiving said motion transmitting pin.

39. A seat recliner as claimed in claim 37, wherein said motion transmitting pipe is rotatably coupled at said one end thereof with said axle.

40. A seat recliner, comprising:

a first hinge member adapted to be fixed to a seat proper and formed with a window;

a second hinge member adapted to be fixed to a seat back;

an axle interconnecting said first and second hinge members;

a spring coupled between said first and second hinge members for pivotally biasing said second hinge member in one direction about said axle relative to said first hinge member;

internal teeth formed in said second hinge member along an arcuate surface thereof, centered on said axle;

a bearing plate having upper teeth, which lockingly cooperate with said internal teeth, said bearing plate having first and second lower surface parts and front and rear faces, wherein said first hinge member has spaced guide walls for guiding said bearing plate in reciprocal directions relative to said guide walls, said guide walls slidably cooperating with said front and rear faces of said bearing plate;

control members for controlling the motion of said bearing plate into and out of engagement with said internal teeth, said control members including a lever pivotally connected to said first hinge member and a cam in unitary motion with said lever for camming said upper teeth of said bearing plate into engagement with said internal teeth of said second hinge member;

a motion transmitting pipe fitted at one end thereof about said axle for rotation therewith, wherein said axle is rotatably supported by said first hinge member, said cam is supported on said axle for rotation therewith, and said lever is supported on said axle for rotation therewith, wherein said cam has a first elevated portion cooperating with said first lower surface part for pushing said bearing plate into locking engagement with said internal teeth, and a second elevated portion cooperating with said second lower surface part for engaging said second lower surface part to prevent said bearing plate from moving out of locking engagement with said internal teeth when, with said bearing plate in locking engagement with said internal teeth, said second hinge member is pivotally biased.

41. A seat recliner, comprising:

a first hinge member adapted to be fixed to a seat proper, said first hinge member being formed with a slot;

a second hinge member adapted to be fixed to a seat back;

a first axle interconnecting said first and second hinge members;

a spring coupled between said first and second hinge members for pivotally biasing said second hinge member in one direction about said axle relative to said first hinge member;

internal teeth formed in said second hinge member along an arcuate surface thereof, centered on said axle;

a bearing plate having upper teeth, which lockingly cooperate with said internal teeth, said bearing plate having first and second lower surface parts and front and rear faces, wherein said first hinge member has spaced guide walls for guiding said bearing plate in reciprocal directions relative to said guide walls, said guide walls slidably cooperating with said front and rear faces of said bearing plate;

control members for controlling the motion of said bearing plate into and out of engagement with said internal teeth, said control members including a lever pivotally connected to said first hinge member and a cam in unitary motion with said lever for camming said upper teeth of said bearing plate into engagement with said internal teeth of said second hinge member;

a motion transmitting pipe having a lug projecting therefrom in a radial direction;

a second axle projecting from said first hinge member at a location distant from said first axle, said motion transmitting pipe being rotatably fitted about said second axle; and a motion transmitting pin disposed in said slot, said motion transmitting pin being fixed to said lever and having an opposite end drivingly engaging said lug, wherein said cam has a first elevated portion cooperating with said first lower surface part for pushing said bearing plate into locking engagement with said internal teeth, and a second elevated portion cooperating with said second lower surface part for engaging said second lower surface part to prevent said bearing plate from moving out of locking engagement with said internal teeth when, with said bearing plate in locking engagement with said internal teeth, said second hinge member is pivotally biased.

* * * * *

UNITED STATES PATENT AND TRADEMARK OFFICE
CERTIFICATE OF CORRECTION

PATENT NO. : 5,813,724
DATED : September 29, 1998
INVENTOR(S) : Hiroshi Matsuura, et al.

It is certified that error appears in the above-identified patent and that said Letters Patent is hereby corrected as shown below:

On the title page, item [75] Inventors, delete "Masakiyo Ohya, Kosai

Signed and Sealed this

Twenty-sixth Day of January, 1999

Attest:

Attesting Officer

*Acting Commissioner of Patents and Trademarks*